United States Patent
Fukuda

(10) Patent No.: US 8,556,403 B2
(45) Date of Patent: *Oct. 15, 2013

(54) AQUEOUS INK FOR INKJET RECORDING

(75) Inventor: Teruyuki Fukuda, Wakayama (JP)

(73) Assignee: Kao Corporation, Tokyo (JP)

( * ) Notice: Subject to any disclaimer, the term of this patent is extended or adjusted under 35 U.S.C. 154(b) by 287 days.

This patent is subject to a terminal disclaimer.

(21) Appl. No.: 12/990,162

(22) PCT Filed: Apr. 22, 2009

(86) PCT No.: PCT/JP2009/057991
§ 371 (c)(1),
(2), (4) Date: Jan. 14, 2011

(87) PCT Pub. No.: WO2009/133797
PCT Pub. Date: Nov. 5, 2009

(65) Prior Publication Data
US 2011/0102496 A1    May 5, 2011

(30) Foreign Application Priority Data

Apr. 28, 2008 (JP) ................................ 2008-117862
Apr. 28, 2008 (JP) ................................ 2008-117863

(51) Int. Cl.
*B41J 2/01* (2006.01)

(52) U.S. Cl.
USPC ............................. 347/100; 347/95; 523/160

(58) Field of Classification Search
USPC .......... 347/100, 95, 96, 101, 102, 105, 88, 99, 347/103; 106/31.6, 31.13, 31.27; 523/160, 523/161
See application file for complete search history.

(56) References Cited

U.S. PATENT DOCUMENTS

| | | |
|---|---|---|
| 4,923,515 A | 5/1990 | Koike et al. |
| 6,051,057 A | 4/2000 | Yatake et al. |

(Continued)

FOREIGN PATENT DOCUMENTS

| | | |
|---|---|---|
| JP | 62-32159 A | 2/1987 |
| JP | 2001-187854 A | 7/2001 |

(Continued)

OTHER PUBLICATIONS

Diethylene Glycol n-butyl ether. MSDS CAS# 112-34-5. Science Lab.com; pp. 1-6.*

(Continued)

*Primary Examiner* — Manish S Shah
(74) *Attorney, Agent, or Firm* — Birch, Stewart, Kolasch & Birch, LLP

(57) ABSTRACT

An aqueous ink for inkjet printing which includes a pigment-containing polymer particle and/or a self-dispersible pigment, a compound represented by formula (1):

$$CH_3-O-(CH_2CH_2O)n-R^1 \quad (1)$$

wherein $R^1$ is hydrogen atom, an aliphatic group having 1 to 6 carbon atoms, or an alicyclic group having 3 to 6 carbon atoms, and n is an average molar number of addition of 6 to 20, and water in a content of 50 to 65% by weight. The content of the compound represented by formula (1) is 10 to 30% by weight. The aqueous ink is excellent in the curl prevention after print, curl prevention after its storage and print density as well as in the storage stability and jetting stability. In a method of inkjet-printing images on plain paper by one-pass print, the water content in the aqueous ink which is jetted onto unit area of the plain paper is regulated within 0.2 to 1.0 mg/cm².

9 Claims, 1 Drawing Sheet

(56) References Cited

U.S. PATENT DOCUMENTS

| | | | |
|---|---|---|---|
| 6,554,891 B1 * | 4/2003 | Momose et al. | 106/31.86 |
| 6,933,330 B2 * | 8/2005 | Hidaka et al. | 523/160 |
| 2003/0179268 A1 | 9/2003 | Koga et al. | |
| 2004/0123774 A1 | 7/2004 | Yamazaki et al. | |
| 2004/0196343 A1 | 10/2004 | Maekawa et al. | |
| 2007/0100067 A1 * | 5/2007 | Fenn et al. | 524/591 |
| 2007/0131144 A1 * | 6/2007 | Winter et al. | 106/31.67 |
| 2009/0167824 A1 * | 7/2009 | Szajewski et al. | 347/84 |

FOREIGN PATENT DOCUMENTS

| | | |
|---|---|---|
| JP | 2003-246954 A | 9/2003 |
| JP | 2003-268268 A | 9/2003 |
| JP | 2004-27139 A | 1/2004 |
| JP | 2004-67747 A | 3/2004 |
| JP | 2004-107632 A | 4/2004 |
| JP | 2005-336486 A | 12/2005 |
| JP | 2007-131817 A | 5/2007 |
| JP | 2007-161753 A | 6/2007 |
| WO | WO 2009/133796 A1 | 11/2009 |
| WO | WO 2009/133797 A1 | 11/2009 |

OTHER PUBLICATIONS

Ethylene Glycol Monomethyl Ether. MSDS CAS# 109-86-4. Matheson Tri Gas; pp. 1-8.*

* cited by examiner

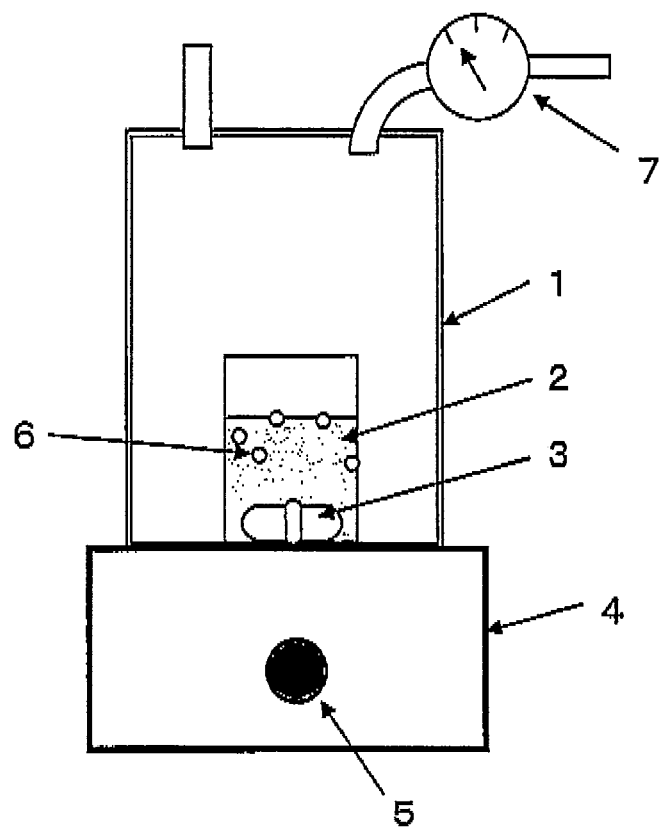

ample, Patent Document 1 discloses an aqueous ink
AQUEOUS INK FOR INKJET RECORDING

TECHNICAL FIELD

The present invention relates to aqueous inks for inkjet printing and an inkjet printing method using the aqueous ink.

BACKGROUND ART

The inkjet printing method is one of the recoding methods in which ink droplets are directly ejected from microscopic nozzles onto a recording medium and are fixed thereon, thereby forming characters and images. The inkjet printing method has been now widely used because of its advantages that the inkjet machines are less noisy and well operable, the colorization is easy, and plain paper is usable as the recording medium. As compared with the electrophotographic printing method widely spreading in office use and quick printing market ahead, the inkjet printing method is an energy-saving method because the heat fixing is not needed. With this additional advantage, the inkjet printing method is getting attention in the market. In particular, an inkjet ink is capable of providing printed matters with a high durability comparable to that of the electrophotographic printing method has been recently developed by using a pigment as the colorant.

However, as compared with the electrophotographic printing method of forming color images on plain paper, the inkjet printing method using an aqueous ink suffers from a problem of the deformation of printed paper called curling.

Several methods of reducing or preventing the curling have been proposed.

For example, Patent Document 1 discloses an aqueous ink composition containing an aqueous carrier medium, an colorant, and a curl preventing agent such as sugars and sugar alcohols. Patent Document 2 discloses an ink composition for thermal inkjet printing which contains a low vapor pressure solvent, a water-soluble dye and water and is added with a sugar having a specific structure.

Patent Document 3 discloses an aqueous ink composition containing an aqueous carrier medium, a colorant, and a curl preventing agent selected from carboxylic amides, etc. Patent Document 4 discloses an ink for inkjet printing containing water, a dye, a lower alkyl ether of polyhydric alcohol, and nonionic acetylene glycol, and further containing at lease one compound selected from glycerol and specific polyhydric alcohols.

However, the proposed methods fail to effectively prevent the curling while maintaining sufficient print density; storage stability, and jetting stability.

To improve the printing characteristics, etc., Patent Document 5 proposes to add a monoalkyl ether of polyhydric alcohol such as tetraethylene glycol monoalkyl ethers and a polyhydric alcohol to an aqueous ink containing a water soluble dye or pigment as the colorant.

To improve the print density and print durability, Patent Document 6 discloses an aqueous ink containing an aqueous dispersion of fine polymer particles containing a colorant and a specific polyalkylene oxide derivative.

To improve the print density; gloss and reliability, Patent Document 7 discloses an aqueous ink containing a water-insoluble vinyl polymer constituted by a monomer which is insoluble in water but soluble in a water-soluble organic solvent, a pigment and a water-soluble organic solvent.

To provide resistance to dryness and resistance to friction, Patent Document 8 discloses a pigment dispersion containing a pigment, α-methyl-ω-hydroxypolyethylene glycol ether having an average molecular weight of 250 to 1000 g/mol, and a dispersant.

Patent Document 1: JP 6-157955A
Patent Document 2: JP 6-240189A
Patent Document 3: JP 9-176538A
Patent Document 4: JP 10-130550A
Patent Document 5: JP 9-255904A
Patent Document 6: JP 2001-139849A
Patent Document 7: JP 2006-282779A
Patent Document 8: JP 2004-521182A

DISCLOSURE OF INVENTION

The present invention relates to:
(1) an aqueous ink for inkjet printing which includes a pigment-containing polymer particle and/or a self-dispersible pigment, a compound represented by formula (1) and water in a content of 50 to 65% by weight, wherein a content of the compound represented by formula (1) is 10 to 30% by weight and formula (1) is represented by $$CH_3-O-(CH_2CH_2O)n-R^1 \quad (1)$$

wherein $R^1$ is hydrogen atom, an aliphatic group having 1 to 6 carbon atoms, or an alicyclic group having 3 to 6 carbon atoms, and n is an average molar number of addition of 6 to 20; and
(2) an inkjet printing method of printing images on a plain paper by one-pass print using the aqueous ink mentioned in (1), wherein a water content in the aqueous ink jetted onto unit area of the plain paper is 0.2 to 1.0 mg/cm².

BRIEF DESCRIPTION OF DRAWINGS

FIG. 1 is a schematic view showing a deaeration tank used in the deaeration test in the examples.

| REFERENCE NUMERALS | |
| --- | --- |
| 1: deaeration tank | 2: glass screw tube containing ink |
| 3: stirrer | 4: magnetic stirrer |
| 5: selector of rotation number control | 6: bubbles |
| 7: pressure gauge | |

BEST MODE FOR CARRYING OUT THE INVENTION

The printing speed of the inkjet printing method has been recently more increased and the jetting stability and reliability in high-speed printing come to be important. In addition, there are problems that the use of pigment as the colorant makes the curling heavy as compared with using a water-soluble dye, and that the curling becomes heavier when the stored ink is used. Under those circumstances, it is important to prevent the curling while retaining the printing characteristics, storage stability; and jetting stability of ink itself.

The present invention relates to an aqueous ink for inkjet printing excellent in the curl prevention after printing even when the ink stored is used and print density; and further excellent in the storage stability and jetting stability. The present invention also relates to an inkjet printing method using such an aqueous ink.

The inventor has found that the curl prevention after printing even when the ink stored is used, print density, storage stability, and jetting stability are improved by incorporating a specific compound having an ethylene oxide chain into an aqueous ink and by controlling the water content within a limited range.

Aqueous Ink for Inkjet Printing

The aqueous ink for inkjet printing of the invention includes pigment-containing polymer particles and/or a self-dispersible pigment, a compound represented by formula (1), and water in a content of 50 to 65% by weight, wherein the content of the compound represented by formula (1) is 10 to 30% by weight and formula (1) is represented by:

$$CH_3\text{—}O\text{—}(CH_2CH_2O)n\text{-}R^1 \quad (1)$$

wherein $R^1$ is hydrogen atom, an aliphatic group having 1 to 6 carbon atoms, or an alicyclic group having 3 to 6 carbon atoms, and n is an average molar number of addition of 6 to 20.

Compound Represented by Formula (1)

The mechanism of preventing the curling by the compound represented by formula (1) is not elucidated but presumed as follows.

The curl has been considered to be caused by the breaking of hydrogen bond of pulp fibers in paper due to the water in ink and the subsequent recombination, which proceeds with the evaporation of water, in a state different from that before the breaking of hydrogen bond. The pulp fibers are formed from fibrous cellulose called microfibrils which are bundled together via hydrogen bonds.

The ethylene oxide chain in the compound represented by formula (1) enters, together with water, between microfibrils, to form hydrogen bond with the hydrophilic moiety inside or on the surface of microfibrils. The hydrogen bond-forming groups of microfibrils are covered with the compound represented by formula (1) as the water is evaporated off, and therefore, the formation of hydrogen bonds is prevented by the methyl group of the compound, i.e. the recombination is prevented, thereby preventing the curling.

In the compound represented by formula (1), $R^1$ is an aliphatic group having 1 to 6 carbon atoms or an alicyclic group having 3 to 6 carbon atoms, preferably a saturated or unsaturated aliphatic hydrocarbon group having 1 to 6 carbon atoms or an alicyclic hydrocarbon group having 3 to 6 carbon atoms.

Examples of $R^1$ include a monovalent straight or branched chain alkyl group having 1 to 6 carbon atoms such as methyl group, ethyl group, n-propyl group, isopropyl group, butyl groups inclusive of n-, t-, and iso-isomeric forms, hexyl groups inclusive of n-, t-, and iso-isomeric forms, and pentyl groups inclusive of n-, t-, and iso-isomeric forms, and a monovalent alicyclic group having 3 to 6 carbon atoms such as pyrrolidinyl group and cyclohexyl group, with a straight or branched chain alkyl group having 1 to 3 carbon atoms being preferred and methyl group being more preferred.

In the compound represented by formula (1), n is 6 to 20, preferably 7 to 18, more preferably 7 to 12, and still more preferably 7 to 10 in view of curl prevention, jetting performance, print density, and deaeration ability.

If n is 6 or more, the surface and inside of microfibril has a good affinity for hydroxyl group and the hydrogen bond-forming groups thereof are well covered, and the hydrogen bond-forming groups are continuously covered after the evaporation of water, to likely enhance the effect of preventing curl. The print density is also increased. If n is 20 or less, the jetting performance and deaeration ability are good. This may be because that the ink hardly bubbles and the bubbles are easily removed.

The content of the compound represented by formula (1) in the aqueous ink is 10 to 30% by weight, preferably 16 to 25% by weight, and still more preferably 20 to 25% by weight in view of the curl prevention, storage stability, jetting stability, and deaeration ability. If 10% by weight or more, the ink is excellent in the curl prevention, print density, and storage stability, and excellent in the jetting stability, print density, and deaeration ability if 30% by weight or less.

The weight ratio of the content of the compound represented by formula (1) to the water content in the aqueous ink (content of the compound represented by formula (1)/water content) is preferably 0.16 to 0.60, more preferably 0.20 to 0.50, and still more preferably 0.25 to 0.45 in view of the curl prevention, storage stability, jetting stability, and deaeration Water Content The water content in the aqueous ink is needed to be 50 to 65% by weight in view of the curl prevention, print density, jetting performance, deaeration ability, and storage stability, with 50 to 60% by weight being preferred and 55 to 60% by weight being more preferred. If 50% by weight or more, the storage stability, print density, and jetting performance are excellent. If 65% by weight or less, the curl prevention is excellent and the deaeration ability is good.

Water-Soluble Organic Solvent

The aqueous ink of the invention may contain a water-soluble organic solvent other than the compound represented by formula (1).

The solubility of the water-soluble organic solvent to 100 g of water at 25° C. is preferably 50 g or more and more preferably 60 g or more. The saturated vapor pressure (20° C.) is preferably 0.001 to 1 kPa.

Examples of the water-soluble organic solvent include polyhydric alcohols preferably having 2 to 10 carbon atoms and more preferably having 2 to 6 carbon atoms such as ethylene glycol, propylene glycol, diethylene glycol, dipropylene glycol, triethylene glycol, tripropylene glycol, tetraethylene glycol, polyethylene glycol, thio diglycol, dithio diglycol, 1,2-hexanediol, 1,6-hexanediol, 2-methyl-1,3-propanediol, 1,2,6-hexanetriol, acetylene glycol derivative, glycerol, and trimethylolpropane; lower alkyl (1 to 6 carbon atoms) ethers of polyhydric alcohols (2 to 6 carbon atoms) such as ethylene glycol monoalkyl (1 to 6 carbon atoms) ether, diethylene glycol monoalkyl (1 to 6 carbon atoms) ether, and triethylene glycol monoalkyl (1 to 6 carbon atoms) ether; heterocyclic compounds such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide and 3-fulfolene; diacetone alcohol, diethanolamine and triethanol amine.

In view of the moisture retention and the wettability and spreadability of dots, at least one solvent selected form polyhydric alcohols, lower alkyl ethers of polyhydric alcohols and heterocyclic compounds is preferably used. More preferred are glycerol and 2-pyrrolidone in view of the moisture retention and triethylene glycol monobutyl ether and 1,2-hexanediol in view of the wettability and spreadability of dots.

In view of the above, the content of the water-soluble organic solvent in the aqueous ink is preferably 1 to 30% by weight and more preferably 1 to 20% by weight.

Surfactant

The aqueous ink of the invention may contain a surfactant. Examples of the surfactant include anionic surfactants such as salts of alkylbenzenesulfonic acids, salts of sulfosuccinic esters, and salts of higher alcohol phosphoric esters (examples of the anionic surfactants such as sodium dodecylbenzenesulfonate and sodium dioctyl sulfosuccinates) and non-ionic surfactant such as salts of fatty acids, salts of higher alcohol esters, ethylene oxide adducts of higher alcohols, ethylene oxide adducts of alkylphenol, ethylene oxide adducts of polyhydric alcohol fatty acid esters, acetylene glycol, and ethylene oxide adducts of acetylene glycol (examples of the nonionic surfactants such as polyoxyethylene nonyl phenyl ether, polyoxyethylene lauryl ether, Surfynol 104, 440, 465, or TG manufactured by Air Products and Chemicals Inc., and Olfine E1010 manufactured by Nissin Chemical Industry Co., Ltd.).

The content of each surfactant in the ink is preferably 0.01 to 10% by mass and more preferably 0.1 to 5% by mass because the smudge of printed characters and the bleed-through of printed images to the back of paper are prevented, Antiseptic/Antifungal Agent In the present invention, an antiseptic/antifungal agent may be further used. Preferred examples thereof include sodium pyridinethione-1-oxide, ethyl p-hydroxybenzoate, 1,2-benzisothiazolin-3-one and salt thereof, sodium dehydroacetate, 2-phenoxyethanol, and sodium benzoate, with 1,2-benzisothiazolin-3-one and salt thereof (Proxel manufactured by Avecia Co. Ltd.) being preferred. The content of each antiseptic/antifungal agent in the ink is preferably 0.001 to 3% by mass and more preferably 0.01 to 1.00% by mass.

Antioxidant

The aqueous ink of the invention preferably contains an antioxidant. The antioxidant prevents the change of ink properties even when the aqueous ink is exposed to high temperatures during transport. It is not fully elucidate why the storage stability is improved by the antioxidant, but presumed that the antioxidant prevents the cleavage of the ethylene oxide chain of the compound represented by formula (1) in the ink, thereby preventing the generation of acid. Therefore, the change of pH attributable to heat history is avoided, to improve the storage stability.

In addition, the change of curl characteristics with time is prevented by the addition of the antioxidant. It is not fully elucidated why the change of curl characteristics with time is prevented by the antioxidant, but presumed as follows. When the compound represented by formula (1) in the ink printed on plain paper is exposed to atmosphere, the ethylene oxide chain of the compound represented by formula (1) in the printed image is prevented from being cleaved if the antioxidant is present in the vicinity thereof, thereby preventing the generation of acid. Therefore, the formation of new hydrogen bond attributable to the acid generated by the oxidation of the compound represented by formula (1) in printed image may be prevented.

Examples of usable antioxidants are not specifically limited and include phenol-type antioxidants, amine-type antioxidants, sulfur-containing antioxidants, and phosphorus-containing antioxidants, which are generally used.

The phenol-type antioxidant (inclusive of hindered phenol-type antioxidant) is preferably 2,6-di-tert-butyl-4-methylphenol, 2,2'-methylenebis(4-ethyl-6-tert-butylphenol), and tetrakis-[methylene-3-(3',5'-di-tert-butyl-4-hydroxyphenyl) propionate]methane in view of the weatherability and stability of aqueous dispersion.

Examples of the amine-type antioxidant include phenyl-β-naphthylamine, α-naphthylamine, N,N'-di-sec-butyl-p-phenylenediamine, phenothiazine, and N,N'-diphenyl-p-phenylenediamine.

Examples of the sulfur-containing antioxidant include dilauryl 3,3'-thiodipropionate, distearyl thiodipropionate, lauryl stearyl thiodipropionate, and dimyristyl 3,3'-thiodipropionate.

The phosphorus-containing antioxidant is preferably triphenyl phosphite, octadecyl phosphite, and trinonylphenyl phosphite.

Examples of other antioxidants include ascorbic acid, its alkali metal salts, isopropyl citrate, and propyl gallate.

Of the above antioxidants, preferred are phenol-type antioxidant, ascorbic acid, and its salts and particularly preferred are 2,6-di-tert-butyl-p-cresol and ascorbic acid.

The content of the antioxidant in the ink is preferably 0.01 to 1% by weight and more preferably 0.05 to 0.5% by weight.

In addition, an ultraviolet absorber (benzophenone-type, benzotriazole-type, salicylate-type, cyanoacrylate-type, and nickel complex salt-type), a light stabilizer (hindered amine-type light stabilizer), and an antiozonant (quinoline-type and phenylenediamine-type) may be added.

Each of the water-soluble organic solvent, surfactant, antiseptic/antifungal agent, and antioxidant mentioned above may be used alone or in combination of two or more.

Pigment

In view of the storage stability and jetting performance, the aqueous ink of the invention contains pigment-containing polymer particles and/or a self-dispersible pigment as a colorant. The pigment to be contained may be either inorganic or organic. These pigments may be combinedly used with an extender pigment.

Examples of the inorganic pigment include carbon black, metal oxide, metal sulfide, and metal halide. Of the above, carbon black is particularly preferred for a black aqueous ink. Examples of carbon black include furnace black, thermal lamp black, acetylene black, and channel black.

Examples of the organic pigment include azo pigment, diazo pigment, phthalocyanine pigment, quinacridone pigment, isoindolinone pigment, dioxazine pigment, perylene pigment, perinone pigment, thioindigo pigment, anthraquinone pigment, and quinophthalone pigment.

The organic pigment is preferably at least one of the numbered pigments selected from C.I. Pigment Yellow, C.I. Pigment Red, C.I. Pigment Violet, C.I. Pigment Blue, and C.I. Pigment Green.

Examples of the extender pigment include silica, calcium carbonate and talc.

The pigment may contain a pigment derivative in view of the dispersion stability. The pigment derivative has a polar group and acts as a surface modifier of the organic pigment to make the pigment easily dispersible. Examples of the polar group include sulfonic acid group, carboxyl group, phosphoric acid group, sulfinic acid group, amino group, amide group, and imide group.

Self-Dispersible Pigment

In view of the print density and jetting performance, the aqueous ink of the invention preferably contains a self-dispersible pigment. The self-dispersible pigment is a pigment which is dispersible in an aqueous medium in the absence of a surfactant or a resin because of one or more kinds of hydrophilic functional groups (anionic hydrophilic group or cationic hydrophilic group) bonded to the surface thereof directly or via an atom group. The term "dispersible" means that a 10% aqueous dispersion keeps its dispersion state stably even after one-month storage at 25° C. when visually observed.

The atom group may be an alkanediyl group having 1 to 24, preferably 1 to 12 carbon atoms, a phenylene group which may be substituted, or a naphthylene group which may be substituted. The pigment may have two or more hydrophilic functional groups which may be the same or different, as long as the object of the invention is not adversely affected.

The anionic hydrophilic group is not specifically limited as long as is has a high hydrophilic nature enough to stably disperse the pigment particles in an aqueous medium. Examples thereof include acidic groups such as carboxyl group (—COOM$^1$), sulfonic acid group (—SO$_3$M$^1$), phosphonic acid group (—PO$_3$M$^1_2$), —SO$_2$NH$_2$, —SO$_2$NHCOR$^{10}$, and their dissociated ionic forms (—COO$^-$, —SO$_3^-$, —PO$_3^{2-}$, —PO$_3$-M$^1$).

In the above formulae, M$^1$ may be the same or different and may be hydrogen atom; alkali metal such as lithium, sodium, and potassium; ammonium; and organoammonium such as monomethylammonium group, dimethylammonium group, trimethylammonium group, monoethylammonium group, diethylammonium group, triethylammonium group, monomethanolammonium group, dimethanolammonium group, and trimethanolammonium group.

R$^{10}$ is an alkyl group having 1 to 12 carbon atoms, phenyl group which may be substituted, or a naphthyl group which may be substituted.

The cationic hydrophilic group may include ammonium group and amino group, with a quaternary ammonium group being preferred.

Of the above hydrophilic functional group, the anionic hydrophilic group is preferred in view of the compatibility with other ingredients in the ink, and carboxyl group (—COOM$^1$) and sulfonic acid group (—SO$_3$M$^1$) are particularly preferred in view of enhancing the reliability of jetting.

The inorganic pigment, organic pigment, and extender pigment mentioned above may be used for forming the self-dispersible pigment. Carbon black is preferably used particularly in a black aqueous ink The pigment is made self-dispersible by chemically bonding a necessary amount of the hydrophilic functional group to the surface of the pigment. To achieve this, any of known methods are usable, for example, those described in U.S. Pat. No. 5,571,311, U.S. Pat. No. 5,630,868, U.S. Pat. No. 5,707, 432, J. E. Johnson, Imaging Science and Technology's 50th Annual Conference (1997), Yuan Yu, Imaging Science and Technology's 53rd Annual Conference (2000), and Polyfile, 1248 (1996).

Specifically, carboxyl group is introduced by an oxidizing acid such as nitric acid, sulfuric acid, persulfuric acid, peroxydisulfuric acid, hypochlorous acid, and chromic acid, a salt thereof, or an oxidant such as hydrogen peroxide, nitrogen oxide, and ozone. Sulfonic acid group is introduced by the thermal decomposition of a persulfuric acid compound. The hydrophilic functional group is also introduced by a diazonium salt having carboxyl group, sulfonic acid group or amino group. Of the above methods, a liquid-phase oxidation using the oxidizing acid is preferred in view of the print density.

The amount of the hydrophilic functional group is not specifically limited and preferably 50 to 5,000 μmol and more preferably 100 to 3,000 μmol per one gram of the self-dispersible pigment in view of the dispersion stability and print density. If the hydrophilic functional group is carboxyl group, the amount is preferably 200 to 750 μmol, more preferably 200 to 700 μmol, and still more preferably 300 to 700 μmol per one gram of the self-dispersible pigment.

The amount of the anionic hydrophilic group is measured by Automatic Potentiometric Titrator AT-610 manufactured by Kyoto Electronics Manufacturing Co., Ltd. Specifically, after adding an excess amount of a 0.01N NaOH to an aqueous dispersion of the self-dispersible pigment, the resulting dispersion is neutralized by a 0.01N HCl. The amount of the anionic hydrophilic group is determined by the amount of the 0.01N HCl added from the inflection point 1 to the final inflection point 2, while taking the neutralization point (inflection point 1) where the excess alkali is neutralized as the start point and the neutralization point (final inflection point 2) which is most acidic of the subsequent inflection points as the end point. The amount of the cationic hydrophilic group is determined, in contrast with the anionic hydrophilic functional group, by adding an excess amount of a 0.01N HCl and then neutralizing the resulting dispersion with a 0.01N NaOH.

The average particle size of the self-dispersible pigment in the aqueous ink is preferably 50 to 300 nm and more preferably 60 to 200 nm in view of the stability of the aqueous ink. The method of measuring the average particle size will be described below.

The anionic self-dispersible pigments (carbon black) commercially available are CAB-O-JET 200 and 300 (Cabot Corporation), BONNET CW-1 and CW-2 (Orient Chemical Industries, Ltd.), and Aqua-Black 162 manufactured by Tokai Carbon Co., Ltd. (about 800 μmol/g as carboxyl group).

The pigments mentioned above may be used alone or in combination of two or more in a desired ratio.

The pigment is preferably in the form of pigment-containing polymer particles in which the pigment is included in polymer particles.

Pigment-Containing Polymer Particles

The aqueous ink of the invention preferably contains pigment-containing polymer particles in view of the jetting performance, water resistance, and effect of preventing curl after storage.

The polymer for use in the pigment-containing polymer particles is preferably a water-insoluble polymer in view of preventing curl. The water-insoluble polymer referred to herein is a polymer having a solubility of 10 g or less, preferably 5 g or less and still more preferably 1 g or less when determined by drying 100 g (solid basis) of the polymer at 105° C. for 2 h until reaching the constant weight and then adding the polymer to 100 g of water at 25° C. If the polymer has a salt-forming group, the solubility is determined after neutralizing 100% of the salt-forming group with acetic acid or sodium hydroxide according to the type thereof.

Examples of the polymer include polyester, polyurethane, and vinyl-based polymer, with the vinyl-based polymer obtained by the addition polymerization of a vinyl monomer (vinyl compound, vinylidene compound, and vinylene compound) being preferred in view of the storage stability.

Vinyl-Based Polymer (Vinyl Polymer)

The vinyl polymer is preferably a copolymer obtained by copolymerizing a monomer mixture of (a) a monomer having a salt-forming group (component (a)), (b) a macromer (component (b)) and/or (c) a hydrophobic monomer (component (c)). Such a vinyl polymer has the constitutional unit derived from the component (a), the constitutional unit derived from the component (b) and/or the constitutional unit derived from the component (c). More preferred vinyl polymer is a water-insoluble, vinyl-based graft polymer having a main chain constituted by the constitutional unit derived from the component (a) or the constitutional units derived from the components (a) and (c) and a side chair constituted by the constitutional unit derived from the component (b).

(a) Monomer Having Salt-Forming Group

The monomer containing a salt-forming group (a) is used to enhance the storage stability of dispersion. Examples of the salt-forming group include carboxyl group, sulfonic acid group, phosphoric acid group, amino group, and ammonium group.

The monomer containing a salt-forming group may include a cationic monomer and anionic monomer described in JP 9-286939A in paragraph [0022].

Representative examples of the cationic monomer are an amine-containing monomer and an ammonium salt-containing monomer, with N,N-dimethylaminoethyl (meth)acrylate, N—(N',N'-dimethylaminopropyl) (meth)acrylamide and vinylpyrrolidone being preferred.

Representative examples of the anionic monomer are a carboxyl group-containing monomer, a sulfonic acid group-containing monomer and a phosphoric acid group-containing monomer.

Examples of the carboxyl group-containing monomer include acrylic acid, methacrylic acid, crotonic acid, itaconic acid, maleic acid, fumaric acid, citraconic acid, and 2-methacryloyloxymethyl succinate. Examples of the sulfonic acid group-containing monomer include styrenesulfonic acid, 2-acrylamido-2-methylpropanesulfonic acid, 3-sulfopropyl (meth)acrylate, and bis(3-sulfopropyl) itaconate. Examples of the phosphoric acid group-containing monomer include vinylphosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Of the above anionic monomers, the carboxyl group-containing monomer is preferred and acrylic acid and methacrylic acid are more preferred in view of the storage stability and jetting stability.

(b) Macromer

The macromer (b) is used to enhance the storage stability of pigment-containing polymer particles and the effect of preventing curl. A macromer having a number average molecular weight of 500 to 100,000, preferably 1,000 to 10,000 and having a polymerizable unsaturated group is preferably used. The number average molecular weight of the macromer (b) is measured by gel permeation chromatography using a 1 mmol/L solution of dodecyldimethylamine in chloroform as the solvent and styrene as the standard substance.

In view of the storage stability of the pigment-containing polymer particles, one or more macromers selected from styrene-based macromers and aromatic group-containing (meth)acrylate-based macromers each having a polymerizable functional group at one terminal end are preferably used.

Examples of the styrene-based macromer include homopolymers of a styrene-based monomer and copolymers of a styrene-based monomer and another monomer. Examples of the styrene-based monomer include styrene, 2-methylstyrene, vinyltoluene, ethylvinylbenzene, vinylnaphthalene, and chlorostyrene.

The aromatic group-containing (meth)acrylate-based macromer may include homopolymers of an aromatic group-containing (meth)acrylate and copolymers of an aromatic group-containing (meth)acrylate and another monomer. The aromatic group-containing (meth)acrylate is a (meth)acrylate having an arylalkyl group having 7 to 22, preferably 7 to 18, and still more preferably 7 to 12 carbon atoms or an aryl group having 6 to 22, preferably 6 to 18, and still more preferably 6 to 12 carbon atoms, each optionally having a heteroatom-containing group such as halogen atom, ester group, ether group and hydroxyl group. Examples thereof include benzyl (meth)acrylate, phenoxyethyl (meth)acrylate, 2-hydroxy-3-phenoxypropyl acrylate, and 2-methacryloyloxyethyl-2-hydroxypropyl phthalate, with benzyl (meth)acrylate being particularly preferred.

The polymerizable functional group at one terminal end of the macromers is preferably acryloyloxy group or methacryloyloxy group. The monomer to be copolymerized is preferably acrylonitrile.

Each of the content of the styrene-based monomer in the styrene-based macromer and the content of the aromatic group-containing (meth)acrylate in the aromatic group-containing (meth)acrylate-based macromer is preferably 50% by weight or more and more preferably 70% by weight or more in view of increasing the affinity to the pigment.

The macromer (b) may have a side chain constituted by another constitutional unit such as organopolysiloxane. The side chain may be formed by the copolymerization of a silicone-based macromer having a polymerizable functional group at one terminal end which is represented by the following formula (2):

$$CH_2=C(CH_3)-COOC_3H_6-[Si(CH_3)_2O]_t-Si(CH_3)_3 \quad (2)$$

wherein t is a number of 8 to 40.

The styrene-based macromer as the component (b) is commercially available under the production names, AS-6(S), AN-6(S), and HS-6(S) each manufactured by Toagosei Co., Ltd.

(c) Hydrophobic Monomer

The hydrophobic monomer is used to improve the print density. Examples of the hydrophobic monomer include an alkyl (meth)acrylate and an aromatic group-containing monomer.

The alkyl (meth)acrylate has an alkyl group having 1 to 22, preferably 6 to 18 carbon atoms and may include, for example, methyl (meth)acrylate, ethyl (meth)acrylate, (iso) propyl (meth)acrylate, (iso or tert)butyl (meth)acrylate, (iso) amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, and (iso)stearyl (meth)acrylate.

The term "(iso or tert)" and "(iso)" referred to herein means iso, tert or normal, or iso or normal, respectively. The term "(meth)acrylate" means acrylate, methacrylate or both.

The aromatic group-containing monomer is preferably an aromatic group-containing vinyl monomer having 6 to 22, preferably 6 to 18, still more preferably 6 to 12 carbon atoms, which may have a hetero-atom containing group. Examples thereof include the styrene-based monomer (component c-1) and the aromatic group-containing (meth)acrylate (component c-2), each mentioned above. The heteroatom-containing group is as described above.

In view of improving the print density, the component (c) is preferably the styrene-based monomer (component c-1) and particularly preferably styrene and 2-methyl styrene. The content of the component (c-1) in the component (c) is preferably 10 to 100% by weight, and more preferably 20 to 80% by weight in view of improving the print density.

The aromatic group-containing (meth)acrylate (component c-2) is preferably benzyl (meth)acrylate or phenoxyethyl (meth)acrylate. The content of the component (c-2) in the component (c) is preferably 10 to 100% by weight and more preferably 20 to 80% by weight in view of improving the print density and storage stability. It is also preferred to combinedly use the compound (c-1) and the component (c-2).

(d) Hydroxyl-Containing Monomer

The monomer mixture may further contain a hydroxyl-containing monomer (component (d)). The hydroxyl-containing monomer (d) is highly effective to enhance the storage stability.

Examples of the component (d) include 2-hydroxyethyl (meth)acrylate, 3-hydroxypropyl (meth)acrylate, polyethylene glycol (n=2 to 30) (meth)acrylate (n is an average molar number of added oxyalkylene groups and the same is applied below), polypropylene glycol (n=2 to 30) (meth)acrylate, and poly(ethylene glycol (n=1 to 15).propylene glycol (n=1 to 15)) (meth)acrylate, with 2-hydroxyethyl (meth)acrylate, polyethylene glycol monomethacrylate, and polypropylene glycol methacrylate being preferred.

(e) Monomer Represented by Formula (3)

The monomer mixture preferably further contains a monomer (e) represented by the following formula (3) (component (e)).

wherein $R^2$ is hydrogen atom or an alkyl group having 1 to 5 carbon atoms, $R^3$ is a divalent hydrocarbon group having 1 to 30 carbon atoms which may have a heteroatom, $R^4$ is a monovalent hydrocarbon group having 1 to 30 carbon atoms which may have a heteroatom or phenyl group which may have an alkyl group having 1 to 9 carbon atoms, and q is an average molar number of addition of 1 to 60 and preferably 1 to 30.

The component (e) is highly effective to enhance the jetting performance and increases the print density of printed images when combinedly used with the compound represented by formula (1).

The heteroatom contained in the monomer of formula (3) is, for example, nitrogen atom, oxygen atom, halogen atom and sulfur atom.

Preferred examples of $R^2$ are methyl group, ethyl group, and (iso)propyl group.

Preferred examples of $R^{30}$ group are oxyethylene group, oxytrimethylene group, oxypropane-1,2-diyl group, oxytetramethylene group, oxyheptamethylene group, oxyhexamethylene group, and an oxyalkanediyl group (oxyalkylene group) having 2 to 7 carbon atoms which is a combination of two or more preceding groups.

Preferred examples of $R^4$ are an aliphatic alkyl group having 1 to 30, preferably 1 to 20, and still more preferably 1 to 8 carbon atoms, an aromatic ring-containing alkyl group having 7 to 30 carbon atoms, a hetero-ring containing alkyl group having 4 to 30 carbon atoms, and phenyl group which may have an alkyl group having 1 to 8 carbon atoms.

Examples of the component (e) include methoxypolyethylene glycol (1 to 30: the value of q in formula (3), the same being applied below) (meth)acrylate, methoxypolytetramethylene glycol (1 to 30) (meth)acrylate, ethoxypolyethylene glycol (1 to 30) (meth)acrylate, octoxypolyethylene glycol (1 to 30) (meth)acrylate, polyethylene glycol (1 to 30) (meth)acrylate 2.ethylhexyl ether, (iso)propoxypolyethylene glycol (1 to 30) (meth)acrylate, butoxypolyethylene glycol (1 to 30) (meth)acrylate, methoxypolypropylene glycol (1 to 30) (meth)acrylate, and methoxy(ethylene glycol-propylene glycol copolymer) (1 to 30 wherein 1 to 29 for ethylene glycol) (meth)acrylate, with octoxypolyethylene glycol (1 to 30) (meth)acrylate and polyethylene glycol (1 to 30) (meth)acrylate 2-ethylhexyl ether being preferred.

The components (d) and (e) commercially available are, for example, acrylate monomers (NK Ester) M-40G, 90G, and 230G manufactured by Shin-Nakamura Chemical Co., Ltd. and Blemmer series of NOF Corporation such as PE-90, 200, and 350, PME-100, 200, 400, and 1000, PP-500, 800, and 1000, AP-150, 400, 550, and 800, 50PEP-300, 50POEP-800B, and 43PAPE600B.

The components (a) to (e) may be used alone or in combination of two or more.

The contents of the component (a) to (e) (based on non-neutralized components, the same will be applied below) in the monomer mixture for the production of vinyl polymer and the content of the constitutional unit derived from each of the component (a) to (e) in the vinyl polymer will be described below.

The content of the component (a) is preferably 3 to 40% by weight, more preferably 4 to 30% by weight, and particularly preferably 5 to 25% by weight in view of the storage stability of the resulting ink.

The content of the component (b) is preferably 1 to 25% by weight and more preferably 5 to 20% by weight particularly in view of increasing the interaction with the pigment and enhancing the curl prevention effect and storage stability.

The content of the component (c) is preferably 5 to 98% by weight and more preferably 10 to 60% by weight in view of improving the print density of the resulting ink.

The content of the component (d) is preferably 5 to 40% by weight and more preferably 7 to 20% by weight in view of the storage stability of the resulting ink.

The content of the component (e) is preferably 5 to 50% by weight and more preferably 10 to 40% by weight in view of improving the jetting performance and print density of the resulting ink.

The total content of the components (a) and (d) in the monomer mixture is preferably 6 to 60% by weight and more preferably 10 to 50% by weight in view of the storage stability of the resulting ink. The total content of the components (a) and (e) is preferably 6 to 75% by weight and more preferably 13 to 50% by weight in view of the storage stability and jetting performance of the resulting ink. The total content of the component (a), (d) and (e) is preferably 6 to 60% by weight and more preferably 7 to 50% by weight in view of the storage stability and jetting performance of the resulting ink.

The weight ratio of component (a)/(component (b)+component (c)) is preferably 0.01 to 1, more preferably 0.02 to 0.67, and still more preferably 0.03 to 0.50 in view of the dispersion stability and print density of the resulting ink.

Production of Polymer

The polymer is produced by the copolymerization of the monomer mixture in a known method such as a bulk polymerization, a solution polymerization, a suspension polymerization, and an emulsion polymerization, with the solution polymerization being preferred.

The solvent for the solution polymerization is preferably a polar organic solvent, although not specifically limited thereto. If the polar organic solvent is miscible with water, a mixed solvent with water is usable. Examples of the polar organic solvent include aliphatic alcohols having 1 to 3 carbon atoms such as methanol, ethanol, and propanol; ketones such as acetone and methyl ethyl ketone; and esters such as ethyl acetate, with methanol, ethanol, acetone, methyl ethyl ketone, and a mixed solvent of at least one of the preceding solvents and water.

The polymerization may be conducted in the presence of a known radical polymerization initiator, for example, an azo compound such as 2,2'-azobisisobutyronitrile and 2,2'-azobis (2,4-dimethylvaleronitrile) and an organic peroxide such as t-butyl peroxyoctoate and dibenzoyl oxide. The amount of the radical polymerization initiator to be used is preferably 0.001 to 5 mol and more preferably 0.01 to 2 mol per one mole of the monomer mixture.

The polymerization may be conducted also in the presence of a known chain transfer agent, for example, a mercaptan such as octylmercaptan and 2-mercaptoethanol.

The polymerization conditions of the monomer mixture depend upon the kinds of the radical polymerization initiator, monomer, and solvent to be used and cannot be determined absolutely. Generally, the polymerization temperature is preferably 30 to 100° C. and more preferably 50 to 80° C., and the polymerization time is preferably 1 to 20 h. The polymerization is preferably conducted in an atmosphere of inert gas such as nitrogen gas and argon gas.

After the polymerization, the formed polymer may be isolated from the reaction solution by a known method such as reprecipitation and evaporation of solvent. The obtained polymer may be purified by removing the non-reacted monomer, etc. by a repeated reprecipitation, membrane separation, chromatography and extraction.

The weight average molecular weight of the polymer used in the invention is preferably 5,000 to 500,000, more preferably 10,000 to 400,000, still more preferably 10,000 to 300,000, and particularly preferably 20,000 to 300,000 in view of the print density and storage stability of the ink. The weight average molecular weight of the polymer was measured by a method described in examples.

If the polymer to be used in the invention has the salt-forming group derived from the salt-forming group-containing monomer (a), the polymer is neutralized by a neutralizing agent before use. The neutralizing agent is selected form acid and base according to the type of the salt-forming group in polymer. Examples thereof include acids such as hydrochloric acid, acetic acid, propionic acid, phosphoric acid, sulfuric acid, lactic acid, succinic acid, glycolic acid, gluconic acid, and glyceric acid; and bases such as lithium hydroxide, sodium hydroxide, potassium hydroxide, ammonia, methylamine, dimethylamine, trimethylamine, ethylamine, diethylamine, triethylamine, triethanolamine, and tributylamine.

The degree of neutralization of the salt-forming groups in the polymer is preferably 50 to 150%, more preferably 50 to 100% and still more preferably 60 to 100% in view of the storage stability.

If the polymer is to be crosslinked, the degree of neutralization of the salt-forming groups in, the polymer before crosslinking is preferably 10 to 90%, more preferably 20 to 80%, and still more preferably 30 to 80% in view of the storage stability and crosslinking efficiency.

The degree of neutralization is determined by the following equation when the salt-forming group is anionic:

$$\{[\text{Weight of neutralizing agent (g)/Equivalence of neutralizing agent}]/[\text{Acid value of polymer (KOH mg/g)} \times \text{Weight of polymer (g)}/(56 \times 1000)]\} \times 100.$$

When the salt-forming group is cationic, the degree of neutralization is determined by the following equation:

$$\{[\text{Weight of neutralizing agent (g)/Equivalence of neutralizing agent}]/[\text{Amine value of polymer (HCl mg/g)} \times \text{Weight of polymer (g)}/(36.5 \times 1000)]\} \times 100.$$

The acid value and the amine value are determined by the calculation based on the constitutional units of the polymer or the titration of a polymer solution in a suitable solvent such as methyl ethyl ketone.

Crosslinking Agent

A compound having in its molecule two or more reactive functional groups is preferably used as the crosslinking agent for crosslinking the surface portion of the polymer in view of the storage stability and curl prevention effect of the ink. The molecular weight of the crosslinking agent is preferably 120 to 2000, more preferably 150 to 1500, and still more preferably 150 to 1000 in view of the easiness of reaction and the storage stability of the resulting crosslinked polymer particles.

The storage stability and curl prevention of the ink is improved by the crosslinking, because the polymer in the pigment-containing polymer particles is prevented from diffusing into the aqueous ink in the presence of the compound represented by formula (1), this in turn preventing the formation of new hydrogen bond between the hydrophilic functional group such as carboxyl group of the polymer and the hydrogen bond-forming group of microfibril.

The number of the reactive functional groups in the crosslinking agent is preferably 2 to 6 in view of controlling the molecular weight and improving the storage stability. The reactive functional group is preferably one or more groups selected from hydroxyl group, epoxy group, aldehyde group, amino group, carboxyl group, oxazoline group, and isocyanate group.

The solubility of the crosslinking agent in 100 g of water at 25° C. is preferably 50 g or less, more preferably 40 g or less, and still more preferably 30 g or less in view of crosslinking the surface of the polymer, particularly the surface of the water-insoluble polymer.

Examples of the crosslinking agent include:

(a) a compound having in, its molecule two or more hydroxyl groups, for example, polyhydric alcohol such as ethylene glycol, diethylene glycol, triethylene glycol, polyethylene glycol, glycerol, polyglycerol, propylene glycol, 1,4-butanediol, 1,5-pentanediol, 1,6-hexanediol, neopentyl alcohol, diethanolamine, tridiethanolamine, polypropylene glycol, polyvinyl alcohol, pentaerythritol, sorbitol, sorbitan, glucose, mannitol, mannitan, sucrose, and glucose;

(b) a compound having in its molecule two or more epoxy groups, for example, polyglycidyl ether such as ethylene glycol diglycidyl ether, polyethylene glycol diglycidyl ether, polypropylene glycol diglycidyl ether, glycerol triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether, and hydrogenated bisphenol A type diglycidyl ether;

(c) a compound having in its molecule two or more aldehyde groups, for example, polyaldehyde such as glutaraldehyde and glyoxal;

(d) a compound having in its molecule two or more amino groups, for example, polyamine such as ethylenediamine and polyethyleneimine;

(e) a compound having in its molecule two or more carboxyl groups, for example, polybasic carboxylic acid such as oxalic acid, malonic acid, succinic acid, fumaric acid, maleic acid, and adipic acid;

(f) a compound having in its molecule two or more oxazoline groups, for example, a compound having an aliphatic group or an aromatic group substituted by 2 or more, preferably 2 to 3 oxazoline groups, and more specifically, a bisoxazoline compound such as 2,2'-bis(2-oxazoline), 1,3-phenylene bisoxazoline, and 1,3-benzobisoxazoline and a compound having a terminal oxazoline group which is obtained by the reaction of the preceding compound and a polybasic carboxylic acid; and (g) a compound having in its molecule two or more isocyanate groups, for example, organic polyisocyanate and isocyanate-terminated prepolymer.

Examples of the organic polyisocyanate include aliphatic diisocyanates such as hexamethylene diisocyanate and 2,2,4-trimethylhexamethylene diisocyanate; aromatic diisocyanates such as tolylene 2,4-diisocyanate and phenylene diisocyanate; alicyclic diisocyanates; aromatic triisocyanate; and their modified products such as urethane-modified products. The isocyanate-terminated prepolymer is obtained by the reaction of the organic polyisocyanate or its modified product with a low-molecular weight polyol.

Of the above, preferred is the compound (b) having in its molecule two or more epoxy groups and more preferred are ethylene glycol diglycidyl ether and trimethylolpropane polyglycidyl ether.

The polymer used in the invention has a reactive group (crosslinkable functional group) which is reactive with the crosslinking agent mentioned above. The suitable combination thereof is as follows.

When the reactive group of the polymer is an anionic group such as carboxyl group, sulfonic acid group, sulfuric acid group, phosphoric acid group, and phosphoric acid group, the crosslinking agents (a), (b), (d), (f), and (g) are preferred. When the reactive group of the polymer is an amino group, the crosslinking agents (b), (e), (e), and (g) are preferred. When the reactive group of the polymer is hydroxyl group, the crosslinking agents (c), (e), and (g) are preferred. When the reactive group of the polymer is isocyanate group or epoxy group, the crosslinking agents (a), (d), and (e) are preferred.

Of the above combinations, the combination including the crosslinking agent having a functional group reactive with the anionic group of the polymer is preferred and a combination including the compound (b) having in its molecule two or more epoxy groups is more preferred in view of forming a moderate crosslinking structure in the polymer.

The polymer having a reactive group (crosslinkable functional group) which is reactive with the crosslinking agent, i.e., an anionic group such as carboxyl group, sulfonic acid group, and phosphoric acid group, amino group, hydroxyl group, isocyanate group, and epoxy group is produced by copolymerizing a polymerizable monomer composition containing a monomer having such reactive group in the production of the polymer mentioned above.

As the polymer having the salt-forming group such as the anionic group and amino group as the group reactive with the crosslinking agent, the polymer copolymerized with the monomer having the salt-forming group is usable. As the polymer having hydroxyl group as the group reactive with the crosslinking agent, the polymer copolymerized with the monomer having hydroxyl group is usable.

As the polymer having epoxy group as the group reactive with the crosslinking agent, a polymer copolymerized with the monomer having epoxy group such as glycidyl (meth) acrylate is usable. As the polymer having isocyanate group as the group reactive with the crosslinking agent, (i) a polymer copolymerized with a monomer having isocyanate group, for example, isocyanate ethyl (meth)acrylate and (ii) a polymer copolymerized with an isocyanate-terminated prepolymer which is obtained from an unsaturated polyester polyol and isocyanate are usable.

Crosslinked Polymer Particles Containing Pigment

The aqueous ink of the invention preferably contains pigment-containing polymer particles having its polymer crosslinked by a crosslinking agent, i.e, crosslinked polymer particles containing a pigment (also referred to as "pigment-containing crosslinked polymer particles") in view of the storage stability and effect of curl prevention, because the aqueous ink contains the compound represented by formula (1), a limited amount of water, and a water-soluble organic solvent.

Examples of the anionic group neutralized by a base include carboxylate ion ($—COOM^1$), sulfonate ion ($—SO_3M^1$), and phosphate ion ($—PO_3M^1{}_2$).

In the above formulae, $M^1$ is as defined in paragraph [0020].

Examples of the base include alkali hydroxide such as sodium hydroxide; alkaline earth hydroxide; amine; organic amine such as triethanolamine; and basic amino acid.

The anionic groups neutralized by a base are dissociated to anions and the electric repulsion between anions may be attributable to the stabilization of the pigment-containing crosslinked polymer particles.

An excessively large amount of the anionic groups neutralized by a base is not preferred in view of the curl prevention because a hydrogen bond is likely to be freshly formed between the hydrophilic functional group such as the carboxyl group in the polymer and the hydrogen bond-forming group in the microfibril.

In view of enhancing the storage stability and effect of curl prevention by the electric repulsion between the pigment-containing crosslinked polymer particles in the presence of the compound represented by formula (1), the amount of the anionic groups neutralized by a base is preferably 0.5 mmol or more, more preferably 0.5 to 5 mmol, more preferably 0.7 to 3 mmol, more preferably 0.7 to 2 mmol, still more preferably 0.7 to 1.5 mmol, and still more preferably 1.0 to 1.5 mmol, each based on one gram of the crosslinked polymer. Within the above ranges, the aqueous ink has high storage stability and curl prevention effect even when the pigment concentration is high and the water content is low.

In view of the storage stability; the pigment-containing polymer particles or the pigment-containing crosslinked polymer particles are produced preferably by a method including step I in which the pigment-containing polymer particles are produced from the pigment and polymer and step II in which the pigment-containing polymer particles obtained in step I and a crosslinking agent are mixed to crosslink the polymer, thereby producing the crosslinked polymer particles.

The production method including step I and step II is conducted, for example, by the following steps (1) to (3):

step (1) wherein a mixture of a polymer, an organic solvent, water, and an optional neutralizing agent is subjected to a dispersing treatment to obtain a dispersion of pigment-containing polymer particles;

step (2) wherein the organic solvent is removed from the dispersion obtained in step (1) to obtain an aqueous dispersion of pigment-containing polymer particles; and step (3) wherein the polymer in the pigment-containing polymer particles obtained in step (2) is crosslinked by a crosslinking agent to obtain an aqueous dispersion of pigment-containing crosslinked polymer particles.

In step (1), an oil-in-water dispersion is preferably obtained by first dissolving the polymer in an organic solvent and then adding the pigment, water and an optional component such as a neutralizing agent and a surfactant to the obtained organic solvent solution. The content of each component in the mixture is preferably 5 to 50% by weight and more preferably 10 to 40% by weight for the pigment, preferably 10 to 70% by weight and more preferably 10 to 50% by weight for the organic solvent, preferably 2 to 40% by weight and more preferably 3 to 20% by weight for the polymer, and preferably 10 to 70% by weight and more preferably 20 to 70% by weight for water.

In view of the storage stability, the weight ratio of the pigment to the total of the polymer and pigment (pigment/(polymer+pigment)) is preferably 55/100 to 90/100 and more preferably 70/100 to 85/100.

When the polymer has a salt-forming group, a neutralizing agent is preferably used. The degree of neutralization by the neutralizing agent is not specifically limited, Generally, the aqueous dispersion finally obtained is preferably neutral, for example, the pH value thereof is preferably 4.5 to 10. The pH value may be determined according to the desired degree of neutralization of the polymer. The neutralizing agent is selected from those described above. The polymer may be neutralized in advance.

Examples of the organic solvent include alcohol solvents such as ethanol, isopropanol, and isobutanol; ketone solvents such as acetone, methyl ethyl ketone, methyl isobutyl ketone, and diethyl ketone; and ether solvents such as dibutyl ether, tetrahydrofuran, and dioxane. Preferred is a solvent wherein its solubility to 100 g of water at 20° C. is preferably 5 g or more and more preferably 10 g or more, and more specifically, preferably 5 to 80 g and still more preferably 10 to 50 g. Particularly preferred are methyl ethyl ketone and methyl isobutyl ketone.

The method of dispersing the mixture in step (1) is not particularly limited. Although the average particle size of the polymer particles may be made finer to a desired level by only a main dispersion, it is preferred to reduce the average particle size of the polymer particles to a desired particle size by a pre-dispersion and a subsequent main dispersion under shearing force. The dispersing temperature of step (1) is preferably 5 to 50° C. and more preferably 10 to 35° C. and the dispersing time is preferably 1 to 30 h and more preferably 2 to 25 h.

The pre-dispersion may be conducted by using a mixing/stirring device generally used, such as an anchor blade. Preferred mixing/stirring device is a high-speed mixing/stirring device such as Ultra Despa (tradename of Asada Iron Works Co., Ltd.), Ebara Milder (tradename of Ebara Corporation), and T. K. Homo, Mixer (tradename of Primix Corporation).

The shearing stress in the main dispersion is applied, for example, by a kneading machine such as roll mill, bead mill, kneader, and extruder; a home-valve type high-pressure homogenizer such as High Pressure Homogenizer (tradename of Izumi Food Machinery Co., Ltd.) and Mini-Lab, type 8.3H (tradename of Rannie); and a chamber type high-pressure homogenizer such as Microfluidizer (tradename of Microfluidics) and Nanomizer (tradename of Nanomizer Inc.). These machines may be used in combination. Of the above, the high-pressure homogenizer is preferably used in view of making the size of pigment finer.

In step (2), the organic solvent is distilled off from the obtained dispersion by a known method to obtain an aqueous dispersion of pigment-containing polymer particles. It is preferred that the aqueous dispersion containing polymer particles is substantially free from the organic solvent, although the organic solvent may remain as long as the object of the invention is not adversely affected. If the crosslinking step is subsequently conducted, the remaining organic solvent may be removed after crosslinking, if necessary. The amount of the remaining organic solvent is preferably 0.1% by weight or less and more preferably 0.01% by weight or less.

The dispersion may be subjected to a mixing treatment under heating before removing the organic solvent by distillation, if necessary. By this treatment, the shelf stability of ink may be enhanced, because the polymer in the dispersion may be more firmly adsorbed onto the pigment, although not fully elucidated.

In the obtained aqueous dispersion of pigment-containing polymer particles, a solid component, i.e., the polymer containing pigment is dispersed in the medium mainly composed of water. The form of the polymer particles is not particularly limited as long as the particles are formed by the pigment and the polymer. For example, a form in which the pigment is enclosed in the polymer, a form in which the pigment is uniformly dispersed throughout the polymer, and a form in which the pigment is exposed to the surface of polymer particles may be mentioned.

In step (3), in view of the curl prevention and storage stability; it is preferred that the pigment-containing polymer particles and the crosslinking agent are mixed to crosslink the polymer, thereby obtaining the pigment-containing crosslinked polymer particles. Specifically, it is preferred that the aqueous dispersion of pigment-containing polymer particles and the crosslinking agent are mixed to crosslink the polymer, thereby obtaining an aqueous dispersion of pigment-containing crosslinked polymer particles. In view of the crosslinking efficiency and the improvement of the storage stability by the crosslinking on the surface portion, it is preferred that the polymer is water-insoluble and the solubility of the crosslinking agent in water is as mentioned above.

In step (3), the catalyst, solvent, temperature, and time may be suitably selected according to the crosslinking agent to be used. The crosslinking time is preferably 0.5 to 10 h and more preferably 1 to 5 h. The crosslinking temperature is preferably 40 to 95° C.

In view of the storage stability and curl prevention, the amount of the crosslinking agent (compound having two or more reactive functional groups in its molecule) to be used is, when expressed by the weight ratio of crosslinking agent/polymer, preferably 0.3/100 to 50/100, more preferably 0.3/100 to 35/100, still more preferably 2/100 to 30/100, still more preferably 5/100 to 25/100, and still more preferably 5/100 to 20/100. In view of enhancing the storage stability of the crosslinked polymer particles and the curl prevention in the presence of the compound represented by formula (1), the crosslinking agent preferably has a functional group reactive with the anionic group of polymer, and the crosslinking agent is used, on the basis of the amount of anionic group per one gram of the polymer, in an amount reactive with preferably 0.1 to 3 mmol, more preferably 0.4 to 2.5 mmol, still more preferably 0.7 to 2.5 mmol, sill, more preferably 0.7 to 2.0 mmol, still more preferably 0.7 to 1.5 mmol of the anionic group of polymer. In view of the same reason, the amount of the crosslinking agent (molar number of crosslinking agent× number of reactive functional groups contributable to crosslinking in one molecule of crosslinking agent) is preferably 0.1 to 3 mmol, more preferably 0.4 to 2.5 mmol, more preferably 0.7 to 2.5 mmol, still more preferably 0.7 to 2.0 mmol, and still more preferably 0.7 to 1.5 mmol, each based on one gram of the polymer.

The crosslinking of the polymer may be also conducted by mixing the dispersion of the pigment-containing polymer particles obtained in step (1) with the crosslinking agent. In this method, the organic solvent in the aqueous dispersion of crosslinked polymer particles obtained by the crosslinking is removed in the same manner as in step (2), thereby obtaining the aqueous dispersion of pigment-containing crosslinked polymer particles.

In view of the storage stability and curl prevention in the presence of the compound represented by formula (1), the crosslinking degree (mol %) of the crosslinked polymer calculated from formula (4) is preferably 10 to 80 mol %, more preferably 20 to 80 mol %, and still more preferably 30 to 60 mol %. The crosslinking degree is calculated from the amount of the crosslinking agent used, the molar number of the reactive groups, the amount of the polymer used, and the molar number of the reactive groups in the polymer which are reactive with the reactive groups in the crosslinking agent.

Crosslinking Degree (mol %)=(molar number of reactive groups in crosslinking agent×100/molar number of reactive groups in polymer which are reactive with crosslinking agent) (4)

In formula (4), the term "molar number of reactive groups in crosslinking agent" is the value obtained by dividing the amount of the crosslinking agent used by the equivalent of the reactive group, i.e., the value obtained by multiplying the molar number of the crosslinking agent used by the number of the reactive groups in one molecule of the crosslinking agent.

The weight ratio of the amount of the pigment to the total of the crosslinked polymer and the pigment (pigment/(crosslinked polymer+pigment)) is preferably 55/100 to 90/100 and more preferably 70/100 to 85/100 in view of the storage stability.

Aqueous Ink for Inkjet Printing

The aqueous ink for inkjet printing of the invention contains the pigment-containing polymer particles and/or the self-dispersible pigment, the compound represented by formula (1), and water, and may be added with an additive generally used in known aqueous ink for inkjet printing such as hydrophilic organic solvent, wetting agent, penetrant, dispersant, viscosity modifier, antifoaming agent, fungicide, and anti-corrosion agent.

In view of maintaining a good jetting performance, the viscosity (20° C.) of the aqueous ink for inkjet printing is preferably 2 to 20 mPa·s and more preferably 5 to 15 mPa·s. The viscosity of the aqueous ink is measured by the method described in the examples.

The surface tension (20° C.) of the aqueous ink is preferably 20 to 50 mN/m and more preferably 27 to 45 mN/m. The pH of the aqueous ink is preferably 4 to 12 and more preferably 5 to 11.

In view of the print density and storage stability, the content of the pigment-containing polymer particles and/or pigment-containing crosslinked polymer particles in the aqueous ink is preferably 3 to 30% by weight, more preferably 4 to 30% by weight, still more preferably 6 to 25% by weight, still more preferably 8 to 20% by weight, and particularly preferably 10 to 15% by weight.

The content of the pigment in the aqueous ink is preferably 5 to 12% by weight and more preferably 6 to 10% by weight in view of the storage stability, print density and prevention of curl. If being 5% by weight or more, a high print density is obtained even by one-pass print in which a high print density is generally difficult to obtain. If being 12% or less, the curling by the pigment is effectively prevented by the compound represented by formula (1).

The average particle size of the pigment-containing polymer particles and/or pigment-containing crosslinked polymer particles is preferably 10 to 500 nm, more preferably 30 to 300 nm, and particularly preferably 50 to 200 nm in view of the prevention of clogging of printer nozzles and storage stability. The average particle size was measured using a laser particle analyzing system (ELS-8000 manufactured by Otsuka Electronics Co., Ltd.) as follows. The ink was diluted with ion-exchange water so that the correlator sensitivity was 8000 to 13000 at 3% filter, and the average particle size of the pigment-containing polymer particles in the ink was measured under the conditions of a temperature of 25° C., an angle between incident light and detector of 90°, and a cumulative number of 200. The refractive index of water (1.333) was input as the refractive index of dispersion medium.

Inkjet Printing Method

The inkjet printing method of the invention is a method of printing images on plain paper by one-pass print using the aqueous ink of the invention and is characterized in that the water content in the aqueous ink jetted onto unit area of the plain paper is 0.2 to 1.0 mg/cm$^2$. By the inkjet printing method of the invention, the curling is effectively prevented and a printed image with a good print density is obtained.

In one-pass print using a line head inkjet printer, images are printed by scanning the inkjet head in the delivery direction of a printing medium at one scanning operation. In one-pass print using a serial head inkjet printer, images are printed by reciprocally scanning the inkjet head in opposite directions while delivering a printing medium in a direction perpendicular to the scanning direction and substantially preventing ink droplets from being jetted onto the ink already on the printing medium, i.e., preventing jetting one ink droplet over another.

In one-pass print, the number of ink droplets jetted onto unit area from inkjet nozzles is reduced, and therefore, the size of each droplet is large as compared with the droplets of multi-pass print. As compared with several dots of small size, the amount of ink jetted onto unit area varies in case of one dot of large size. Therefore, the amount of jetted ink is larger at some small portions of printing paper to allow the ink to easily soak. The aqueous ink of the invention is suitable for one-pass print because of its curl prevention effect.

The printing paper is not particularly limited, and either of plain paper or special paper which is generally available may be used, with plain paper being preferably used in view of exhibiting the effect of the invention.

In view of obtaining a sufficient print density while preventing the clogging, preventing the bleed-through of printed images to the back surface, and preventing the curling of the printed plain paper, the water content in the aqueous ink jetted onto unit area of the plain paper is preferably 0.2 to 1.0 mg/cm$^2$ and more preferably 0.4 to 0.8 mg/cm$^2$.

The color of images to be printed may be a single color such as cyan, magenta, yellow, green, red, orange, black, and gray or a multi-order color such as secondary color and tertiary color which is made by mixing two or more single colors on a printing paper.

The inkjet printer capable of using the aqueous ink of the invention is not particularly limited and the aqueous ink is particularly suitable for on-demand inkjet printers of thermal type and piezoelectric type. The aqueous ink of the invention is also suitable for high-speed printers, for example, a printer with a printing speed of 3 to 150 pages/min, preferably 5 to 100 pages/min, and more preferably 10 to 100 pages/min.

EXAMPLES

In the following production examples, preparation examples, examples, and comparative examples, "part(s)" and "%" are weight-based unless otherwise noted. In Tables 1 to 10, the amounts are expressed by weight parts. The measurements and evaluations of the weight average molecular weight of polymer, the viscosity of ink, the deaeration ability, the jetting performance, the jetting stability, the curl prevention effect, the print density, and the storage stability were made by the following methods.

(1) Measurement of Weight Average Molecular Weight of Polymer

Measured by gel chromatography using N,N-dimethylformamide containing 60 mmol/L of phosphoric acid and 50 mmol/L of lithium bromide as the eluent and polystyrene as the standard.

Column: TSK-GEL, α-M×2 manufactured by Tosoh Corporation

Apparatus: HLC-8120GPC manufactured by Tosoh Corporation

Flow rate: 1 mL/min (2) Measurement of Viscosity of Ink

Measured by using E-type viscometer manufactured by Toki Sangyo Co., Ltd.

Standard rotor: 1°34'×R24

Measuring temperature: 20° C.

Measuring time: one minute

Rotation number: maximum acceptable rotation number of apparatus for ink used within 20 to 100 rpm.

(3) Evaluation of Deaeration Ability

Into a 100-ml glass screw tube 2, 50 g of ink was charged with a stirrer 3. After placing the tube 2 in a deaeration tank 1 as shown in FIG. 1, the pressure was reduced to 0.02 MPa or lower and the ink was stirred at 120 rpm for 10 min using a magnetic stirrer 4. After stirring, the reduction in the number of bubbles 6 which were attributable to the air dissolved in the ink was observed. The time after stopping the stirring until the number of bubbles 3 was reduced to three was measured.

The shorter the measured time, the more the productivity of ink is favorably improved and also the jetting performance is good.

(4) Evaluation of Jetting Performance (Resistance to Clogging)

The ink supply opening disposed on the upper portion of a black inkjet head in an inkjet printer (EM-930C manufactured by Seiko Epson Corporation) was filled with the ink after the evaluation of deaeration ability via a silicone tube. The cleaning and nozzle check were repeated until the ink was jetted from all the nozzles. Then, the inkjet head was moved to the center of printer from it capping position and kept there for one minute to expose the black head to ambient atmosphere of 25° C. and 55% humidity. Then, the nozzles were checked to count the number of defect nozzles. The above operation was conducted five times, and the obtained numbers were averaged and rounded at the first decimal place.

The smaller the number of defect nozzles, the better the jetting performance.

(5) Evaluation of Jetting Stability (Degree of Jetting)

The ink supply opening disposed on the upper portion of the black head in the inkjet printer (EM-930C) was filled with the ink after the evaluation of deaeration ability via a silicone tube. Using the utility software of the printer, the cleaning operation was repeated three times. After all the black head nozzles were ready for jetting the ink, a black solid image (204 mm×275 mm) drawn by using Photoshop with RGB setting zero was printed on a commercially available plain paper (XEROX 4200 (trade name), plain paper manufactured by Xerox Corporation).

Printing pager: plain paper

Mode: black, fine (one pass), opposite directions

The jetting amount was measured from the change in the weight of the screw tube containing the ink. The measurement was conducted 5 times and the results were averaged. The obtained averaged value was divided by the viscosity of each ink to obtain the jetting coefficient Kn. The percentage ratio of the jetting coefficient of each ink to the jetting coefficient of the comparative ink 1 was defined as the degree of jetting Jn.

A high degree of jetting Jn shows that the viscosity (viscosity at high shear) when the ink is jetted from inkjet nozzles is low even when the viscosity (viscosity at low shear) measured by E-type viscometer is high. Namely, when the inks having the same viscosity are provided with the same jetting energy, a larger amount of ink is jetted if the degree of jetting Jn is high. Therefore, the defective jetting due to the change of operating environment and the variation of the jetting performance between head nozzles can be prevented.

The higher the degree of jetting, the better the jetting stability.

(6) Evaluation of Curl Prevention Effect 1 (Curling Height)

After all the nozzles of the black head were ready for jetting, a black or gray image (204 mm×275 mm) was printed on the plain paper (XEROX 4200) mentioned above by using the inkjet printer (EM-930C) while controlling the jetting amount.

Printing paper: plain paper

Mode: black, fine (one pass), opposite directions

The image density of the respective black or gray images was uniform.

The jetting amount was controlled by changing Duty of image by Photoshop. The black image was printed by whole nozzle jetting and the gray image was printed under decreased Duty to reduce the jetting amount. The printing was repeated by controlling Duty so as to regulate the amount of ink actually jetted within 0.80±0.01 mg/cm$^2$ in average while determining the jetting amount from the change in the weight of the screw tube containing the ink. The time required for printing was 9 s per page.

The printing was conducted five times and immediately after printing the printed papers were left stand flat on an aluminum pan rack manufactured by As One Corporation with the printed surface up. After left stand for one month at 25° C. and 55% humidity, the heights of the warped four corners were measured by a ruler, and obtained 20 values were averaged.

The smaller the height of curl, the larger the curl prevention effect.

(7) Evaluation of Print Density

After allowing the five solid-printed papers obtained in the same manner as in the evaluation of degree of jetting to stand at 25° C. and 55% humidity, the print density of the printed surface was measured by Macbeth densitometer (product number: RD914, manufactured by GretagMacbeth).

Observation light source: D65

Observation field: 2°

Density standard: DIN16536

White standard: Density of surface of non-printed plain paper (XEROX 4200).

Filter: Not used.

The print density of the printed color was determined from the color densities of the printed black, cyan, yellow, and magenta colors corresponding to the color of ink. The measuring points were selected randomly form the images printed by bidirectional scanning, five points from the forward scan and five points from the backward scan. The obtained 10 values were averaged.

A higher print density is better.

(8) Evaluation of Storage Stability (Degree of Viscosity Change)

The initial viscosity and the viscosity after standing at 70° C. for one week of the ink were measured by a E-type viscometer manufactured by Toki Sangyo Co., Ltd.

Standard rotor: 1°34'×R24

Measuring temperature: 20° C.

Measuring time: one minute

Rotation number: maximum acceptable rotation number of apparatus for ink used within 20 to 100 rpm. The change of viscosity was obtained from the formula: [viscosity after standing (mPa·s)]×100/[initial viscosity (mPa·s)]. The nearer the change of viscosity to 100%, the better the storage stability.

(9) Evaluation of Curl Prevention Effect 2 (Curling Height of Stored Ink)

The image was printed and the curling height was measured in the same manner as in the evaluation of curling height except for using the ink used in the evaluation of storage stability. The smaller the curling height, the larger the curl prevention effect.

Production Example 1

Production of Polymer Solution 1

Into a Reaction Vessel, 20 Parts of Methyl Ethyl Ketone, 0.03 Part of a chain transfer agent (2-mercaptoethanol) and 10% of a monomer mixture containing (a) 15 parts of methacrylic acid. (GE-110 (MAA), product name of Mitsubishi Gas Chemical Company, Inc.), (b) 10 parts (based on effective component, 20 parts of 50% solution) of styrene macromer (AS-6S, product name of Toagosei Co., Ltd., number average molecular weight: 6,000, 50% toluene solution), (c) 30 parts of 2-ethylhexyl methacrylate (Acryester EH, product name of Mitsubishi Rayon Co., Ltd.), (d) 30 parts of styrene monomer (styrene monomer, product name of Nippon Steel Chemical Co., Ltd.), and (e) 15 parts of methoxypolyethylene glycol monomethacrylate (NK ester M-90G, product name of Shin-Nakamura Chemical Co., Ltd., compound of formula (3) wherein q is 9, $R^4$ and $R^6$ are each methyl group, and $R^5$ is ethylene group) were charged. The mixture was stirred and sufficiently purged with nitrogen gas, to obtain a mixed solution.

Separately, 90% of the rest of monomer mixture was charged in a dropping funnel, to which 0.27 parts of a chain transfer agent (2-mercaptoethanol), 60 parts of methyl ethyl ketone, and 1.2 parts of 2,2'-azobis(2,4-dimethylvaleronitrile) were added. The mixture was stirred and purged with nitrogen gas sufficiently, to obtain a mixed solution.

The mixed solution in the reaction vessel was heated to 75° C. under stirring in nitrogen atmosphere, and then, the mixed solution in the dropping funnel was slowly added dropwise to the reaction vessel over 3 h. After the addition, the mixed solution was kept at 75° C. for 2 h. Then, a solution of 0.3 part of 2,2'-azobis(2,4-dimethylvaleronitrile) in 5 parts of methyl ethyl ketone was added to the mixed solution. Thereafter, the mixed solution was aged at 75° C. for 2 h and further at 85° C. for 2 h to terminate the reaction, thereby obtaining polymer solution 1.

A portion of the obtained polymer solution 1 was dried under reduced pressure at 105° C. for 2 h to remove the solvent. The polymer thus separated had a weight average molecular weight of 196,000.

Preparation Example 1

Preparation of Aqueous Dispersion 1 Containing Pigment-Containing Crosslinked Polymer Particles In 70 parts of methyl ethyl ketone, 25 parts of polymer which had been obtained by drying the polymer solution 1 obtained in Production Example 1 under reduced pressure was dissolved. The polymer was neutralized by adding 4.1 parts of a 5N aqueous solution of sodium hydroxide and 230 parts of ion exchange water (degree of neutralization: 75%). After dispersing the neutralized solution with Ultradespa manufactured by Asada Iron Works Co., Ltd. (2000 rpm of disper blade, 10 min), 100 parts of magenta pigment "Pigment Violet 19" (Ink Jet Magenta E5B 02, product name of Clariant (Japan) K.K. was added, and the resulting mixture was further dispersed at 15° C. or lower at 9000 rpm forth.

The obtained dispersion was dispersed with Pico Mill manufactured by Asada Iron Works Co., Ltd. (dispersion medium: zirconia, 20° C., weight ratio of dispersion medium/dispersion: 8/2) at a peripheral speed of 15 m/s for 2 h. The obtained dispersion was further dispersed with Microfluidizer (product name of Microfluidics Corporation) under 200 MPa with 10 times circulations. The obtained dispersion was added with 250 parts of ion exchange water, stirred, and then immersed in a water bath at 60° C. under reduced pressure to remove methyl ethyl ketone and a portion of water, thereby obtaining an aqueous dispersion with a solid concentration of 30%.

After adding 0.177 g of a crosslinking agent (Denacol EX321, product name of Nagase ChemteX Corporation, epoxy equivalent: 140, solubility in 100 g of water: about 27 g at 25° C.) to 40 g of the obtained aqueous dispersion, the dispersion was stirred at 90° C. or lower for 1 h. After stirring, the dispersion was cooled and filtered with a 25-mL needleless syringe (manufactured by Terumo Corporation) equipped with a 5 μm filter (acetylcellulose membrane manufactured by Fujifilm Corporation, outer diameter: 2.5 cm), to obtain aqueous dispersion 1 with a solid concentration of 30%.

Degree of Crosslinking, etc. in Preparation Example 1
Degree of crosslinking (formula (4)):

$$(0.177/140)\times 100/(1.6\times 0.17/86)=40 \text{ (mol \%)}$$

wherein the amount of crosslinking agent: 0.177 g, the epoxy equivalent: 140, the amount of polymer used: 1.6 g, the content of constitutional unit derived from methacrylic acid in polymer: 0.17, and the molecular weight of methacrylic acid: 86.

Amount of anionic group neutralized by base per 1 g of crosslinked polymer:

$$111/56\times 0.75\times (1.6/1.777)=1.34 \text{ (mmol)}$$

wherein, the acid value of polymer: 111 and degree of neutralization: 75%.

Amount of crosslinking agent used: amount reactive with 0.00126×1.6×1000=0.79 mmol of anionic group per 1 g of polymer.

Example 1

Production of Ink 1 Containing Pigment-Containing Crosslinked Polymer Particles

A mixture containing:

20 parts of polyethylene glycol monomethyl ether 350 (manufactured by Alfa Aesar, average molar number of added ethylene oxide: 7);

2 parts of 2-pyrrolidone (manufactured by Wako Pure Chemical Industries, Ltd.);

2 parts of triethylene glycol monobutyl ether (butyl triglycol, product name of Nippon Nyukazai Co., Ltd. (hereinafter referred to as "TEGmBE"));

2 parts of 1,2-hexanediol (solvent for improving wettability and spreadability, manufactured by Tokyo Kasei Kogyo Co., Ltd.);

0.5 part of Surfynol 465 (wetting agent manufactured by Nissin Chemical Industry Co., Ltd., 65% ethylene oxide adduct of Surfynol 104);

0.5 part of Olfine E1010 (wetting agent manufactured by Nissin Chemical Industry Co., Ltd., 10 mol ethylene oxide adduct of acetylenediol);

0.3 part of Proxel XL2 (preservative manufactured by Avecia KK);

0.2 part of 2,6-di-t-butyl-p-cresol (Antage BHT, product name of Kawaguchi Chemical Industry Co., Ltd.; and 30.8 parts of ion exchange water was stirred at room temperature for 15 actin, to obtain a diluent for the production of ink. Then, the diluent was added to 41.7 parts (solid content: 30%) of the aqueous dispersion 1 obtained in Preparation Example 1 in a rate of about 5 g/s under stirring with a magnetic stirrer at 120 rpm. After the addition, the stirring was continued at room temperature for 1 h to obtain a liquid mixture, which was then filtered through a 1.2 μm filter (acetylcellulose membrane manufactured by Fujifilm Corporation, outer diameter: 2.5 cm), to obtain Ink 1.

The results of evaluation thereof are shown in Table 1.

Preparation Example 2

Preparation of Aqueous Dispersion 2 Containing Pigment-Containing Crosslinked Polymer Particles Aqueous dispersion 2 having a solid concentration of 30% was prepared in the same manner as in Preparation Example 1 except for using a yellow pigment "Pigment Yellow 74" (Fast Yellow 7414, product name of Sanyo Color Works, Ltd.) in place of the magenta pigment "Pigment Violet 19."

Example 2

Production of Ink 2 Containing Pigment-Containing Crosslinked Polymer Particles

Ink 2 was produced in the same manner as in Example 1 except for using polyethylene glycol monomethyl ether 550 manufactured by Alfa Aesar (average molar number of added ethylene oxide: 12) in place of polyethylene glycol monomethyl ether 350 and using the aqueous dispersion 2 obtained in Preparation Example 2 in place of the aqueous dispersion 1 obtained in Preparation Example 1.

The evaluation results thereof are shown in Table 1.

Preparation Example 3

Preparation of Aqueous Dispersion 3 Containing Self-Dispersible Pigment

A round-bottomed flask containing 300 g of Cab-o-jet 270 (self-dispersible pigment manufactured by Cabot Corporation, solid concentration: 10% by weight) was soaked in a water bath at 60° C. to evaporate off the water under reduced pressure, thereby adjusting the concentration. The resulting dispersion was filtered through a 5 μm filter in the same manner as in Preparation Example 1, to obtain aqueous dispersion 3 containing self-dispersible pigment having a solid concentration of 20% was obtained.

Example 3

Production of Ink 3 Containing Self-Dispersible Pigment

Ink 3 was produced in the same manner as in Example 1 except for using 3.5 parts of 2-pyrrolidone, 3 parts of TEG-mBE, 20 parts of ion exchange water, and 50 parts of the aqueous dispersion 3 (solid content: 20%) obtained in Preparation Example 3 in place of the aqueous dispersion 1 obtained in Preparation Example 1.

Each ink shown below was produced on the basis of Examples 1 to 3 while changing the respective compositions and evaluated. In each table, the evaluation results were compared with the results on the Inks 1 to 3 obtained in Examples 1 to 3.

Examples 4-15 and Comparative Examples 1-6

Change of Content of Compound of Formula (1)

Inks 4 to 15 and comparative Inks 1 to 6 were produced in the same manner as in Examples 1 to 3 except for using polyethylene glycol monomethyl ether 350, polyethylene glycol monomethyl ether 550, 2-pyrrolidone, TEGmBE, and ion exchange water in respective amounts shown in Table 1.

The evaluation results thereof are shown in Table 1.

As seen from Table 1, it can be seen that both the curl prevention effect and storage stability are excellent when the content of the compound represented by formula (1) is within 10 to 30% by weight.

TABLE 1

| | | Ink Composition | | | | | | | |
|---|---|---|---|---|---|---|---|---|---|
| | | aqueous dispersion (colorant) | | compound (1) | | other additives (wt. parts) | | water | compound (1)/water |
| | | kind of pigment | solid content wt. % | kind | wt. % | 2-PDN | TEGmBE | wt. % | wt. ratio |
| Comp. 1 | comp. Ink 1 | crosslinked particle 1 | 12.5 | none | 0.0 | 2.0 | 22.0 | 60.0 | 0.00 |
| Comp. 2 | comp. Ink 2 | crosslinked particle 1 | 12.5 | Me-EO7 | 5.0 | 2.0 | 17.0 | 60.0 | 0.08 |
| Ex. 4 | Ink 4 | crosslinked particle 1 | 12.5 | Me-EO7 | 10.0 | 2.0 | 12.0 | 60.0 | 0.17 |
| Ex. 5 | Ink 5 | crosslinked particle 1 | 12.5 | Me-EO7 | 16.0 | 2.0 | 6.0 | 60.0 | 0.27 |
| Ex. 1 | Ink 1 | crosslinked particle 1 | 12.5 | Me-EO7 | 20.0 | 2.0 | 2.0 | 60.0 | 0.33 |
| Ex. 6 | Ink 6 | crosslinked particle 1 | 12.5 | Me-EO7 | 24.0 | 0.0 | 0.0 | 60.0 | 0.40 |
| Ex. 7 | Ink 7 | crosslinked particle 1 | 12.5 | Me-EO7 | 27.5 | 0.0 | 1.5 | 55.0 | 0.50 |
| Comp. 3 | comp. Ink 3 | crosslinked particle 2 | 12.5 | none | 0.0 | 2.0 | 22.0 | 60.0 | 0.00 |

TABLE 1-continued

| | | | | | | | | | |
|---|---|---|---|---|---|---|---|---|---|
| Comp. 4 | comp. Ink 4 | crosslinked particle 2 | 12.5 | Me-EO12 | 9.0 | 2.0 | 13.0 | 60.0 | 0.15 |
| Ex. 8 | Ink 8 | crosslinked particle 2 | 12.5 | Me-EO12 | 10.0 | 2.0 | 12.0 | 60.0 | 0.17 |
| Ex. 9 | Ink 9 | crosslinked particle 2 | 12.5 | Me-EO12 | 16.0 | 2.0 | 6.0 | 60.0 | 0.27 |
| Ex. 2 | Ink 2 | crosslinked particle 2 | 12.5 | Me-EO12 | 20.0 | 2.0 | 2.0 | 60.0 | 0.33 |
| Ex. 10 | Ink 10 | crosslinked particle 2 | 12.5 | Me-EO12 | 24.0 | 0.0 | 0.0 | 60.0 | 0.40 |
| Ex. 11 | Ink 11 | crosslinked particle 2 | 12.5 | Me-EO12 | 27.5 | 0.0 | 1.5 | 55.0 | 0.50 |
| Comp. 5 | comp. Ink 5 | self-dispersible type 3 | 10.0 | none | 0.0 | 2.0 | 24.5 | 60.0 | 0.00 |
| Comp. 6 | comp. Ink 6 | self-dispersible type 3 | 10.0 | Me-EO12 | 9.0 | 2.0 | 15.5 | 60.0 | 0.15 |
| Ex. 12 | Ink 12 | self-dispersible type 3 | 10.0 | Me-EO12 | 10.0 | 2.0 | 14.5 | 60.0 | 0.17 |
| Ex. 13 | Ink 13 | self-dispersible type 3 | 10.0 | Me-EO12 | 16.0 | 2.0 | 8.5 | 60.0 | 0.27 |
| Ex. 3 | Ink 3 | self-dispersible type 3 | 10.0 | Me-EO12 | 20.0 | 2.0 | 4.5 | 60.0 | 0.33 |
| Ex. 14 | Ink 14 | self-dispersible type 3 | 10.0 | Me-EO12 | 24.0 | 0.0 | 2.5 | 60.0 | 0.40 |
| Ex. 15 | Ink 15 | self-dispersible type 3 | 10.0 | Me-EO12 | 27.5 | 0.0 | 4.0 | 55.0 | 0.50 |

| | Evaluation Results | | | | | | |
|---|---|---|---|---|---|---|---|
| | water content* (mg/cm$^2$) | deaeration ability (min) | jetting performance | jetting stability (J) | curl prevention effect 1 (cm) | print density | storage stability (%) | curl prevention effect 2 (cm) |
| Comp. 1 | 0.48 | 3 | 0 | 100% | 5.2 | 0.86 | 143 | — |
| Comp. 2 | 0.48 | 3 | 0 | 100% | 1.9 | 0.91 | 115 | — |
| Ex. 4 | 0.48 | 5 | 0 | 102% | 1.8 | 0.91 | 113 | — |
| Ex. 5 | 0.48 | 7 | 0 | 106% | 0.9 | 0.93 | 102 | — |
| Ex. 1 | 0.48 | 9 | 0 | 113% | 0.5 | 0.95 | 103 | 0.7 |
| Ex. 6 | 0.48 | 14 | 0 | 117% | 0.3 | 0.96 | 103 | — |
| Ex. 7 | 0.44 | 20 | 0 | 110% | 0.2 | 0.93 | 104 | — |
| Comp. 3 | 0.48 | 9 | 0 | 100% | 4.8 | 0.91 | 195 | — |
| Comp. 4 | 0.48 | 9 | 0 | — | 1.9 | 0.95 | 116 | — |
| Ex. 8 | 0.48 | 9 | 0 | 103% | 1.5 | 1.00 | 109 | — |
| Ex. 9 | 0.48 | 11 | 0 | 105% | 0.8 | 1.02 | 106 | — |
| Ex. 2 | 0.48 | 15 | 0 | 112% | 0.3 | 1.04 | 103 | 0.3 |
| Ex. 10 | 0.48 | 17 | 0 | 116% | 0.8 | 1.04 | 104 | — |
| Ex. 11 | 0.44 | 20 | 0 | 110% | 0.3 | 1.01 | 102 | — |
| Comp. 5 | 0.48 | 5 | 2 | — | 5.2 | 0.91 | gelated | — |
| Comp. 6 | 0.48 | 4 | 3 | — | 1.9 | 0.95 | 109 | — |
| Ex. 12 | 0.48 | 4 | 0 | — | 1.6 | 1.01 | 109 | — |
| Ex. 13 | 0.48 | 5 | 0 | — | 0.9 | 1.03 | 107 | — |
| Ex. 3 | 0.48 | 10 | 0 | — | 0.4 | 1.05 | 104 | 0.5 |
| Ex. 14 | 0.48 | 12 | 0 | — | 0.9 | 1.05 | 105 | — |
| Ex. 15 | 0.44 | 16 | 0 | — | 0.5 | 1.02 | 103 | — |

*water content in printed image.

Examples 16-24 and Comparative Examples 7-12

Change of Water Content

Inks 16 to 24 and comparative Inks 7 to 12 were produce in the same manner as in Examples 1 to 3 except for using polyethylene glycol monomethyl ether 350, polyethylene glycol monomethyl ether 550, 2-pyrrolidone, TEGmBE, and ion exchange water in respective amounts shown in Table 2. The evaluation results thereof are shown in Table 2.

As seen from Table 2, the curl prevention effect and storage stability are excellent when the water content is within 50 to 65% by weight.

TABLE 2

| | | Ink Composition | | | | | | | |
|---|---|---|---|---|---|---|---|---|---|
| | | aqueous dispersion (colorant) | | compound (1) | | other additives (wt. parts) | | water | compound (1)/water |
| | | kind of pigment | solid content wt. % | kind | wt. % | 2-PDN | TEGmBE | wt. % | wt. ratio |
| Comp. 7 | comp. Ink 7 | crosslinked particle 1 | 12.5 | Me-EO7 | 20.0 | 2.0 | 17.0 | 45.0 | 0.44 |
| Ex. 16 | Ink 16 | crosslinked particle 1 | 12.5 | Me-EO7 | 20.0 | 2.0 | 12.0 | 50.0 | 0.40 |
| Ex. 17 | Ink 17 | crosslinked particle 1 | 12.5 | Me-EO7 | 20.0 | 2.0 | 7.0 | 55.0 | 0.36 |
| Ex. 1 | Ink 1 | crosslinked particle 1 | 12.5 | Me-EO7 | 20.0 | 2.0 | 2.0 | 60.0 | 0.33 |
| Ex. 18 | Ink 18 | crosslinked particle 1 | 12.5 | Me-EO7 | 16.0 | 2.0 | 1.0 | 65.0 | 0.25 |
| Comp. 8 | comp. Ink 8 | crosslinked particle 1 | 12.5 | Me-EO7 | 16.0 | 0.0 | 0.5 | 67.5 | 0.24 |
| Comp. 9 | comp. Ink 9 | crosslinked particle 2 | 12.5 | Me-EO12 | 20.0 | 2.0 | 17.0 | 45.0 | 0.44 |
| Ex. 19 | Ink 19 | crosslinked particle 2 | 12.5 | Me-EO12 | 20.0 | 2.0 | 12.0 | 50.0 | 0.40 |
| Ex. 20 | Ink 20 | crosslinked particle 2 | 12.5 | Me-EO12 | 20.0 | 2.0 | 7.0 | 55.0 | 0.36 |
| Ex. 2 | Ink 2 | crosslinked particle 2 | 12.5 | Me-EO12 | 20.0 | 2.0 | 2.0 | 60.0 | 0.33 |
| Ex. 21 | Ink 21 | crosslinked particle 2 | 12.5 | Me-EO12 | 16.0 | 2.0 | 1.0 | 65.0 | 0.25 |
| Comp. 10 | comp. Ink 10 | crosslinked particle 2 | 12.5 | Me-EO12 | 16.0 | 0.0 | 0.5 | 67.5 | 0.24 |
| Comp. 11 | comp. Ink 11 | self-dispersible type 3 | 10.0 | Me-EO12 | 20.0 | 2.0 | 19.5 | 45.0 | 0.44 |
| Ex. 22 | Ink 22 | self-dispersible type 3 | 10.0 | Me-EO12 | 20.0 | 2.0 | 14.5 | 50.0 | 0.40 |
| Ex. 23 | Ink 23 | self-dispersible type 3 | 10.0 | Me-EO12 | 20.0 | 2.0 | 9.5 | 55.0 | 0.36 |
| Ex. 3 | Ink 3 | self-dispersible type 3 | 10.0 | Me-EO12 | 20.0 | 2.0 | 4.5 | 60.0 | 0.33 |
| Ex. 24 | Ink 24 | self-dispersible type 3 | 10.0 | Me-EO12 | 16.0 | 0.0 | 5.5 | 65.0 | 0.25 |
| Comp. 12 | comp. Ink 12 | self-dispersible type 3 | 10.0 | Me-EO12 | 16.0 | 0.0 | 3.0 | 67.5 | 0.24 |

| | Evaluation Results | | | | | | |
|---|---|---|---|---|---|---|---|
| | water content* (mg/cm$^2$) | deaeration ability (min) | jetting performance | jetting stability (J) | curl prevention effect 1 (cm) | print density | storage stability (%) | curl prevention effect 2 (cm) |
| Comp. 7 | 0.36 | 5 | 3 | — | 0.1 | 0.89 | 132 | — |
| Ex. 16 | 0.40 | 7 | 0 | — | 0.2 | 0.93 | 109 | — |
| Ex. 17 | 0.44 | 10 | 0 | — | 0.4 | 0.95 | 107 | — |
| Ex. 1 | 0.48 | 9 | 0 | 113% | 0.5 | 0.95 | 103 | 0.7 |
| Ex. 18 | 0.52 | 13 | 0 | — | 1.7 | 0.93 | 101 | — |
| Comp. 8 | 0.54 | 15 | 0 | — | 2.9 | 0.92 | 101 | — |
| Comp. 9 | 0.36 | 7 | 5 | — | 0.1 | 0.97 | 132 | — |
| Ex. 19 | 0.40 | 10 | 0 | — | 0.2 | 1.00 | 109 | — |
| Ex. 20 | 0.44 | 13 | 0 | — | 0.4 | 1.02 | 107 | — |
| Ex. 2 | 0.48 | 15 | 0 | 112% | 0.3 | 1.04 | 103 | 0.3 |
| Ex. 21 | 0.52 | 17 | 0 | — | 1.7 | 1.04 | 101 | — |
| Comp. 10 | 0.54 | 20 | 0 | — | 2.9 | 1.04 | 101 | — |
| Comp. 11 | 0.36 | 2 | 6 | — | 0.2 | 0.97 | gelated | — |
| Ex. 22 | 0.40 | 5 | 0 | — | 0.3 | 1.01 | 109 | — |
| Ex. 23 | 0.44 | 8 | 0 | — | 0.5 | 1.03 | 108 | — |
| Ex. 3 | 0.48 | 10 | 0 | — | 0.4 | 1.05 | 104 | 0.5 |
| Ex. 24 | 0.52 | 12 | 0 | — | 1.8 | 1.05 | 102 | — |
| Comp. 12 | 0.54 | 16 | 0 | — | 3.3 | 1.05 | 102 | — |

*water content in printed image.

Comparative Examples 13-16

Change of Pigment, etc

Comparative Example 13

Production of Ink 13 Containing High Soluble Dye

Comparative Ink 13 was produced in the same manner as in Example 1 except for changing the amount of TEGmBE to 4.5 parts and ion exchange water, to 60 parts and using 10 parts of Acid Blue 9 (high soluble dye manufactured by Tokyo Kasai Kogyo Co., Ltd.) in place of the aqueous dispersion 1.

Comparative Example 14

Production of Ink 14 Containing Low Soluble Dye

Comparative Ink 14 was produced in the same manner as in Comparative Example 13 except for changing the amount of polyethylene glycol monomethyl ether 350 to 27 parts and using 3 parts of Food Yellow 5 (low soluble dye manufactured by Tokyo Kasei Kogyo Co., Ltd.) in place of Acid. Blue 9.

Comparative Preparation Example 1

Preparation of Aqueous Dispersion Containing Polymer Dispersion Type Pigment

A mixture of 25 parts of a polymer dispersant (Demol C (formalin condensate of sulfonic acid salt of polycyclic aromatic compound), product name of Kao Corporation), 400 parts of water, and 75 parts of the magenta pigment "Pigment Violet 19" used in Preparation Example 1 was stirred with a disper blade at 20° C. for 1 h. The obtained mixture was dispersed by Microfluidizer under 200 MPa with 10 times circulations.

After adding 250 parts of ion exchange water, the obtained dispersion was stirred and 1 part of water was removed under reduced pressure. Then, the dispersion was filtered through a 5 μm filter in the same manner as in Preparation Example 1, to obtain an aqueous dispersion having a solid concentration of 30% and containing the polymer dispersion type pigment.

Comparative Example 15

Production of Comparative Ink 15 Containing Polymer Dispersion Type Pigment

Comparative Ink 15 was produced in the same manner as in Example 1 except for using the aqueous dispersion containing the polymer dispersion type pigment obtained in Comparative Preparation Example 1 in place of the aqueous dispersion 1 obtained in Preparation Example 1.

Comparative Preparation Example 2

Production of Aqueous Dispersion Containing Polymer Dispersion Type Pigment

An aqueous dispersion having a solid concentration of 30% and containing a polymer dispersion type pigment was produced in the same manner as in Comparative Preparation Example 1 except for using the yellow pigment "Pigment Yellow 74" in place of the magenta pigment "Pigment Violet 19."

Comparative Example 16

Production of Comparative Ink 16 Containing Polymer Dispersion Type Pigment

Comparative Ink 16 was produced in the same manner as in Example 1 (production of Ink 1) except for using 41.7 parts of the aqueous dispersion (solid content: 30%) containing the polymer dispersion type pigment obtained in Comparative Preparation Example 2 in place of the aqueous dispersion 1 containing the pigment-containing crosslinked polymer particles.

The evaluation results of the comparative Inks 13 to 16 are shown in Table 3.

As seen from Table 3, it can be seen that the storage stability, jetting performance, and also the curl prevention effect after storage are excellent when the colorant is the pigment-containing polymer particles and/or the self dispersible pigment.

TABLE 3

| | | Ink Composition | | | | | | | |
|---|---|---|---|---|---|---|---|---|---|
| | | aqueous dispersion (colorant) | | | | other additives (wt. parts) | | | compound (1)/water |
| | | kind of pigment | solid content wt. % | compound (1) kind | wt. % | 2-PDN | TEGmBE | water wt. % | wt. ratio |
| Ex. 1 | Ink 1 | crosslinked particle 1 | 12.5 | Me-EO7 | 20.0 | 2.0 | 2.0 | 60.0 | 0.33 |
| Comp. 13 | comp. Ink 13 | dye Acid Blue | 10.0 | Me-EO7 | 20.0 | 2.0 | 4.5 | 60.0 | 0.33 |
| Comp. 14 | comp. Ink 14 | yellow food dye | 3.0 | Me-EO7 | 27.0 | 2.0 | 4.5 | 60.0 | 0.45 |
| Comp. 15 | comp. Ink 15 | polymer dispersion type 1 | 12.5 | Me-EO7 | 20.0 | 2.0 | 2.0 | 60.0 | 0.33 |
| Ex. 2 | Ink 2 | crosslinked particle 2 | 12.5 | Me-EO12 | 20.0 | 2.0 | 2.0 | 60.0 | 0.33 |

TABLE 3-continued

| | | | | | | | | | |
|---|---|---|---|---|---|---|---|---|---|
| Ex. 3 | Ink 3 | self-dispersible type 3 | 10.0 | Me-EO12 | 20.0 | 2.0 | 4.5 | 60.0 | 0.33 |
| Comp. 16 | comp. Ink 16 | polymer dispersion type 2 | 12.5 | Me-EO12 | 20.0 | 2.0 | 2.0 | 60.0 | 0.33 |

| | Evaluation Results | | | | | | |
|---|---|---|---|---|---|---|---|
| | water content* (mg/cm$^2$) | deaeration ability (min) | jetting performance | jetting stability (J) | curl prevention effect 1 (cm) | print density | storage stability (%) | curl prevention effect 2 (cm) |
| Ex. 1 | 0.48 | 9 | 0 | 113% | 0.5 | 0.95 | 103 | 0.7 |
| Comp. 13 | 0.48 | 2 | 0 | — | 0.3 | 0.97 | aggregated | — |
| Comp. 14 | 0.48 | 2 | 6 | — | 0.3 | 0.68 | aggregated | — |
| Comp. 15 | 0.48 | 15 | 1 | — | 1.0 | 0.94 | 106 | 3.0 |
| Ex. 2 | 0.48 | 15 | 0 | 112 | 0.3 | 1.04 | 103 | 0.3 |
| Ex. 3 | 0.48 | 10 | 0 | — | 0.4 | 1.05 | 104 | 0.5 |
| Comp. 16 | 0.48 | not deaerated | 7 | — | 1.0 | 0.99 | 106 | — |

*water content in printed image.

Examples 25-32

Change of Polymer

Preparation Example 4

Preparation of Aqueous Dispersion 4 Containing Pigment-Containing Non-crosslinked Polymer Particles As described below, aqueous dispersion 4 was prepared in the same manner as in Preparation Example 1 except for omitting the crosslinking step. In 70 parts of methyl ethyl ketone, 25 parts of the polymer which had been obtained by drying the polymer solution 1 under reduced pressure was dissolved. The polymer was then neutralized by adding 4.1 parts of a 5N aqueous solution of sodium hydroxide and 230 parts of ion exchange water. After dispersed with Ultradespa, the obtained liquid was added with 100 parts of a magenta pigment "Pigment Violet 19" and then further treated for dispersion. The obtained dispersion was further dispersed with Pico Mill and then with Microfluidizer. The dispersion was added with 250 parts of ion exchange water and stirred, and methyl ethyl ketone and a portion of water were removed under reduced pressure, to obtain aqueous dispersion 4 having a solid concentration of 30%.

Example 25

Production of Ink 25 Containing Pigment-Containing Non-Crosslinked Polymer Particles Ink 25 was produced in the same manner as in Example 1 except for using the aqueous dispersion 4 obtained in Preparation Example 4 in place of the aqueous dispersion 1 obtained in Preparation Example 1.

Preparation Example 5

Preparation of Aqueous Dispersion 5 Containing Pigment-Containing Non-Crosslinked Polymer Particles Aqueous dispersion 5 having a solid concentration of 30% was prepared in the same manner as in Preparation Example 4 except for using a yellow pigment "Pigment Yellow 74" (FastYellow 7414, product name of Sanyo Color Works, Ltd.) in place of the magenta pigment "Pigment Violet 19."

Example 26

Production of Ink 26 Containing Pigment-Containing Non-Crosslinked Polymer Particles Ink 26 was produced in the same manner as in Example 1 except for using the aqueous dispersion 4 obtained in Preparation Example 5 in place of the aqueous dispersion 1 obtained in Preparation Example 1.

Preparation Example 6

Preparation of Aqueous Dispersion 6 Containing Pigment-Containing Crosslinked Polymer Particles Aqueous dispersion 6 was prepared in the same manner as in Preparation Example 1 except for changing the amount of the 5N aqueous solution of sodium hydroxide to 1.4 parts (degree of neutralization: 26%) and the amount of ion exchange water from 230 parts to 232.7 parts. The amount of the anionic group neutralize by the base was 0.47 mmol/g per one gram of the crosslinked polymer.

Example 27

Production of Ink 27 Containing Pigment-Containing Crosslinked Polymer Particles Ink 27 was produced in the same manner as in Example 1 except for using the aqueous dispersion 6 obtained in Preparation Example 6 in place of the aqueous dispersion 1 obtained in Preparation Example 1.

Preparation Example 7

Preparation of Aqueous Dispersion 7 Containing Pigment-Containing Crosslinked Polymer Particles Aqueous dispersion 7 was prepared in the same manner as in Preparation Example 2 except for changing the amount of the 5N aqueous solution of sodium hydroxide to 1.4 parts (degree of neutralization: 26%) and the amount of ion exchange water from 230 parts to 232.7 parts. The amount of the anionic group neutralized by the base was 0.47 mmol/g per one gram of the crosslinked polymer.

Example 28

Production of Ink 28 Containing Pigment-Containing Crosslinked Polymer Particles Ink 28 was produced in the same manner as in Example 1 except for using the aqueous dispersion 7 obtained in Preparation Example 7 in place of the aqueous dispersion 1 obtained in Preparation Example 1.

Production Example 2

Production of Polymer Solution 2

Polymer Solution 2 was Produced in the Same Manner as in Production Example 1 except for (b) omitting the use of the styrene macromer and (c) changing the amount of the styrene monomer to 40 parts.

A portion of the obtained polymer solution 2 was dried at 105° C. for 2 h under reduced pressure to remove the solvent. The weight average molecular weight of the separated polymer was 172,000.

Preparation Example 8

Preparation of Aqueous Dispersion 8 Containing Pigment-Containing Crosslinked Polymer Particles Aqueous dispersion 8 having a solid concentration of 30% was prepared in the same manner as in Preparation Example 1 except for using the polymer solution 2 in place of the polymer solution 1.

Example 29

Production of Ink 29 Containing Pigment-Containing Crosslinked Polymer Particles Ink 29 was produced in the same manner as in Example 1, except for using the aqueous dispersion 8 obtained in Preparation Example 8 in place of the aqueous dispersion 1 obtained in Preparation Example 1.

Preparation Example 9

Preparation of Aqueous Dispersion 8 Containing Pigment-Containing Crosslinked Polymer Particles Aqueous dispersion 9 having a solid concentration of 30% was prepared in the same manner as in Preparation Example 2 except for using the polymer solution 2 in place of the polymer solution 1.

Example 30

Production of Ink 30 Containing Pigment-Containing Crosslinked Polymer Particles Ink 30 was produced in the same manner as in Example 1 except for using the aqueous dispersion 9 obtained in Preparation Example 9 in place of the aqueous dispersion 1 obtained in Preparation Example 1.

Production Example 3

Production of Polymer Solution 3

Polymer Solution 3 was Produced in the Same Manner as in Production Example 1 except for (e) omitting the use of methoxypolyethylene glycol monomethacrylate and (c) changing the amount of styrene monomer to 45 parts.

A portion of the obtained polymer solution 3 was dried at 105° C. for 2 h under reduced pressure to remove the solvent. The weight average molecular weight of the separated polymer was 186,000.

Preparation Example 10

Preparation of Aqueous Dispersion 10 Containing Pigment-Containing Crosslinked Polymer Particles Aqueous dispersion 10 having a solid concentration of 30% was prepared in the same manner as in Preparation Example 1 except for using the polymer solution 3 in place of the polymer solution 1.

Example 31

Production of Ink 31 Containing Pigment-Containing Crosslinked Polymer Particles Ink 31 was produced in the same manner as in Example 1 except for using the aqueous dispersion 10 obtained in Preparation Example 10 in place of the aqueous dispersion 1 obtained in Preparation Example 1.

Preparation Example 11

Preparation of Aqueous Dispersion 11 Containing Pigment-Containing Crosslinked Polymer Particles Aqueous dispersion 11 having a solid concentration of 30% was prepared in the same manner as in Preparation Example 2 except for using the polymer solution 3 in place of the polymer solution 1.

Example 32

Production of Ink 32 Containing Pigment-Containing Crosslinked Polymer Particles Ink 32 was produced in the same manner as in Example 1 except for using the aqueous dispersion 11 obtained in Preparation Example 11 in place of the aqueous dispersion 1 obtained in Preparation Example 1.

The evaluation results of Examples 25 to 32 are shown in Table 4.

TABLE 4

| | | Ink Composition | | | | | | | |
|---|---|---|---|---|---|---|---|---|---|
| | | aqueous dispersion (colorant) | | compound (1) | | other additives (wt. parts) | | water | compound (1)/water |
| | | kind of pigment | solid content wt. % | kind | wt. % | 2-PDN | TEGmBE | wt. % | wt. ratio |
| Ex. 1 | Ink 1 | crosslinked particle 1 | 12.5 | Me-EO7 | 20.0 | 2.0 | 2.0 | 60.0 | 0.33 |
| Ex. 2 | Ink 2 | crosslinked particle 2 | 12.5 | Me-EO12 | 20.0 | 2.0 | 2.0 | 60.0 | 0.33 |
| Ex. 25 | Ink 25 | polymer particle 4 | 12.5 | Me-EO7 | 20.0 | 2.0 | 2.0 | 60.0 | 0.33 |
| Ex. 26 | Ink 26 | polymer particle 5 | 12.5 | Me-EO12 | 20.0 | 2.0 | 2.0 | 60.0 | 0.33 |
| Ex. 27 | Ink 27 | crosslinked particle 6 | 12.5 | Me-EO7 | 20.0 | 2.0 | 2.0 | 60.0 | 0.33 |
| Ex. 28 | Ink 28 | crosslinked particle 7 | 12.5 | Me-EO12 | 20.0 | 2.0 | 2.0 | 60.0 | 0.33 |
| Ex. 29 | Ink 29 | crosslinked particle 8 | 12.5 | Me-EO7 | 20.0 | 2.0 | 2.0 | 60.0 | 0.33 |
| Ex. 30 | Ink 30 | crosslinked particle 9 | 12.5 | Me-EO12 | 20.0 | 2.0 | 2.0 | 60.0 | 0.33 |
| Ex. 31 | Ink 31 | crosslinked particle 10 | 12.5 | Me-EO7 | 20.0 | 2.0 | 2.0 | 60.0 | 0.33 |
| Ex. 32 | Ink 32 | crosslinked particle 11 | 12.5 | Me-EO12 | 20.0 | 2.0 | 2.0 | 60.0 | 0.33 |

| | Evaluation Results | | | | | | |
|---|---|---|---|---|---|---|---|
| | water content* (mg/cm$^2$) | deaeration ability (min) | jetting performance | jetting stability (J) | curl prevention effect 1 (cm) | print density | storage stability (%) | curl prevention effect 2 (cm) |
| Ex. 1 | 0.48 | 9 | 0 | 113% | 0.5 | 0.95 | 103 | 0.7 |
| Ex. 2 | 0.48 | 15 | 0 | 112% | 0.3 | 1.04 | 103 | 0.3 |
| Ex. 25 | 0.48 | 12 | 1 | — | 1.5 | 0.95 | 117 | — |
| Ex. 26 | 0.48 | 25 | 1 | — | 1.1 | 1.04 | 114 | — |
| Ex. 27 | 0.48 | 7 | 1 | — | 0.4 | 0.95 | 115 | — |
| Ex. 28 | 0.48 | 15 | 1 | — | 0.2 | 1.04 | 116 | — |
| Ex. 29 | 0.48 | 12 | 1 | — | 0.9 | 0.93 | 116 | — |
| Ex. 30 | 0.48 | 20 | 1 | — | 0.9 | 1.02 | 118 | — |
| Ex. 31 | 0.48 | 7 | 0 | — | 0.5 | 0.92 | 102 | — |
| Ex. 32 | 0.48 | 15 | 0 | — | 0.3 | 1.01 | 102 | — |

*water content in printed image.

Examples 33-35

Absence of Antioxidant

Inks 36 to 39 were produce in the same manner as in Examples 1 to 3 except for using TEGmBE in place of 2,6-di-t-butyl-p-cresol. The evaluation results thereof are shown in Table 5.

TABLE 8

| | | Ink Composition | | | | | | | |
|---|---|---|---|---|---|---|---|---|---|
| | | aqueous dispersion (colorant) | | compound (1) | | other additives (wt. parts) | | water | compound (1)/water |
| | | kind of pigment | solid content wt. % | kind | wt. % | 2-PDN | TEGmBE | wt. % | wt. ratio |
| Ex. 1 | Ink 1 | crosslinked particle 1 | 12.5 | Me-EO7 | 20.0 | 2.0 | 2.0 | 60.0 | 0.33 |
| Ex. 33 | Ink 33 | crosslinked particle 1 | 12.5 | Me-EO7 | 20.0 | 2.0 | 2.2 | 60.0 | 0.33 |

TABLE 8-continued

| | | | | | | | | | |
|---|---|---|---|---|---|---|---|---|---|
| Ex. 2 | Ink 2 | crosslinked particle 2 | 12.5 | Me-EO12 | 20.0 | 2.0 | 2.0 | 60.0 | 0.33 |
| Ex. 34 | Ink 34 | crosslinked particle 2 | 12.5 | Me-EO12 | 20.0 | 2.0 | 2.2 | 60.0 | 0.33 |
| Ex. 3 | Ink 3 | self-dispersible type 3 | 10.0 | Me-EO12 | 20.0 | 2.0 | 4.5 | 60.0 | 0.33 |
| Ex. 35 | Ink 35 | self-dispersible type 3 | 10.0 | Me-EO12 | 20.0 | 2.0 | 4.7 | 60.0 | 0.33 |

| | Evaluation Results | | | | | | |
|---|---|---|---|---|---|---|---|
| | water content* (mg/cm$^2$) | deaeration ability (min) | jetting performance | jetting stability (J) | curl prevention effect 1 (cm) | print density | storage stability (%) | curl prevention effect 2 (cm) |
| Ex. 1 | 0.48 | 9 | 0 | 113% | 0.5 | 0.95 | 103 | 0.7 |
| Ex. 33 | 0.48 | 9 | 0 | — | 0.5 | 0.95 | 108 | 1.5 |
| Ex. 2 | 0.48 | 15 | 0 | 112% | 0.3 | 1.04 | 103 | 0.3 |
| Ex. 34 | 0.48 | 15 | 0 | — | 0.3 | 1.04 | 101 | 1.3 |
| Ex. 3 | 0.48 | 10 | 0 | — | 0.4 | 1.05 | 104 | 0.5 |
| Ex. 35 | 0.48 | 10 | 0 | — | 0.5 | 1.05 | 102 | 1.5 |

*water content in printed image.

Examples 36-37 and Comparative Example 17

Change of Ethylene Oxide Chain of Compound Represented by Formula (1)

Inks 36 to 37 and comparative Ink 17 were produced in the same manner as in Example 3 except for using, as shown in Table 6, polyethylene glycol monomethyl ether (average molar number of added ethylene oxide: 15), polyethylene glycol monomethyl ether (average molar number of added ethylene oxide: 20), and polyethylene glycol monomethyl ether (average molar number of added ethylene oxide: 21) respectively in place of the polyethylene glycol monomethyl ether 550.

The evaluation results of Example 36 to 37 and Comparative Example 17 are shown in Table 6.

TABLE 6

| | | Ink Composition | | | | | | | |
|---|---|---|---|---|---|---|---|---|---|
| | | aqueous dispersion (colorant) | | compound (1) | | other additives (wt. parts) | | water | compound (1)/water |
| | | kind of pigment | solid content wt. % | kind | wt. % | 2-PDN | TEGmBE | wt. % | wt. ratio |
| Ex. 3 | Ink 3 | self-dispersible type 3 | 10.0 | Me-EO12 | 20.0 | 2.0 | 4.5 | 60.0 | 0.33 |
| Ex. 36 | Ink 36 | self-dispersible type 3 | 10.0 | Me-EO15 | 20.0 | 2.0 | 4.5 | 60.0 | 0.33 |
| Ex. 37 | Ink 37 | self-dispersible type 3 | 10.0 | Me-EO20 | 20.0 | 2.0 | 4.5 | 60.0 | 0.33 |
| Comp. 17 | com. Ink 17 | self-dispersible type 3 | 10.0 | Me-EO21 | 20.0 | 2.0 | 4.5 | 60.0 | 0.33 |

| | Evaluation Results | | | | | | | |
|---|---|---|---|---|---|---|---|---|
| | water content* (mg/cm$^2$) | deaeration ability (min) | jetting performance | jetting stability (J) | curl prevention effect 1 (cm) | print density | storage stability (%) | curl prevention effect 2 (cm) |
| Ex. 3 | 0.48 | 10 | 0 | — | 0.4 | 1.05 | 104 | 0.5 |
| Ex. 36 | 0.48 | 15 | 0 | — | 0.4 | 1.06 | 104 | — |
| Ex. 37 | 0.48 | 19 | 0 | — | 0.4 | 1.07 | 104 | — |
| Comp. 17 | 0.48 | 45 | 6 | — | 0.6 | 1.05 | 105 | — |

*water content in printed image.

Examples 38-43

Change of Water Content in Printed Image

Example 38

The ink supply opening in the upper portion of the black head of an inkjet printer (EM-930C) was filled with Ink 1 through a silicone tube. Then, the trial printing was made while changing Duty on Photoshop to adjust Duty so that the actually jetted amount was within $0.40\pm0.01$ mg/cm$^2$ in average. The jetted amount was determined by measuring the change in the weight of the screw tube containing the ink. The solid image at the adjusted Duty was printed on a commercially available plain paper (XEROX 4200) into a size of 204 mm×275 mm.

Printing Paper: plain paper
Mode: black, fine, opposite directions
The time required for printing was 9 s per page. The water content in the printed image was 0.24 mg/cm$^2$.

Example 39

In the same manner as in Example 38, the printing was made except for adjusting Duty so that the jetted amount of ink was within $0.60\pm0.01$ mg/cm$^2$ in average and the second printing at the same Duty was clone on the same surface immediately after the first printing.

The water content in the printed image was 0.72 mg/cm$^2$.

Example 40

In the same manner as in Example 38, the printing was made except for adjusting Duty so that the jetted amount of ink was within $0.80\pm0.01$ mg/cm$^2$ in average and the second printing at the same Duty was done on the same surface immediately after the first printing.

The water content in the printed image was 0.96 mg/cm$^2$.

Examples 41-43

The procedures of Examples 38 to 40 were repeated by changing Ink 1 to Ink 2. The evaluation results by changing the water content are shown in Table 7.

The evaluation results of Examples 38 to 43 are shown in Table 7.

TABLE 7

| | | Ink Composition | | | | | | | |
|---|---|---|---|---|---|---|---|---|---|
| | | aqueous dispersion (colorant) | | | | other additives (wt. parts) | | water | compound (1)/water |
| | | kind of pigment | solid content wt. % | compound (1) kind | wt. % | 2-PDN | TEGmBE | wt. % | wt. ratio |
| Ex. 1 | Ink 1 | crosslinked particle 1 | 12.5 | Me-EO7 | 20.0 | 2.0 | 2.0 | 60.0 | 0.33 |
| Ex. 38 | Ink 38 | crosslinked particle 1 | 12.5 | Me-EO7 | 20.0 | 2.0 | 2.0 | 60.0 | 0.33 |
| Ex. 39 | Ink 39 | crosslinked particle 1 | 12.5 | Me-EO7 | 20.0 | 2.0 | 2.0 | 60.0 | 0.33 |
| Ex. 40 | Ink 40 | crosslinked particle 1 | 12.5 | Me-EO7 | 20.0 | 2.0 | 2.0 | 60.0 | 0.33 |
| Ex. 2 | Ink 2 | crosslinked particle 2 | 12.5 | Me-EO12 | 20.0 | 2.0 | 2.0 | 60.0 | 0.33 |
| Ex. 41 | Ink 41 | crosslinked particle 2 | 12.5 | Me-EO12 | 20.0 | 2.0 | 2.0 | 60.0 | 0.33 |
| Ex. 42 | Ink 42 | crosslinked particle 2 | 12.5 | Me-EO12 | 20.0 | 2.0 | 2.0 | 60.0 | 0.33 |
| Ex. 43 | Ink 43 | crosslinked particle 2 | 12.5 | Me-EO12 | 20.0 | 2.0 | 2.0 | 60.0 | 0.33 |

| | Evaluation Results | | | | | | |
|---|---|---|---|---|---|---|---|
| | water content* (mg/cm$^2$) | deaeration ability (min) | jetting performance | jetting stability (J) | curl prevention effect 1 (cm) | print density | storage stability (%) | curl prevention effect 2 (cm) |
| Ex. 1 | 0.48 | 9 | 0 | 113% | 0.5 | 0.95 | 103 | 0.7 |
| Ex. 38 | 0.24 | — | — | — | 0.1 | — | — | — |
| Ex. 39 | 0.72 | — | — | — | 0.5 | — | — | — |
| Ex. 40 | 0.96 | — | — | — | 0.9 | — | — | — |
| Ex. 2 | 0.48 | 15 | 0 | 112% | 0.3 | 1.04 | 103 | 0.3 |
| Ex. 41 | 0.24 | — | — | — | 0.1 | — | — | — |
| Ex. 42 | 0.72 | — | — | — | 0.5 | — | — | — |
| Ex. 43 | 0.96 | — | — | — | 0.9 | — | — | — |

*water content in printed image.

Examples 44-47 and Comparative Examples 18-27

Other Examples and Comparative Examples

Preparation Example 12

Preparation of Aqueous Dispersion Containing Self-Dispersible Pigment

Aqueous dispersion 12 having a solid concentration of 20% and containing the self-dispersible pigment was prepared in the same manner as in Preparation Example 3 except for using Cab-o-jet 260 (self-dispersible pigment manufactured by Cabot Corporation, solid concentration: 10% by weight) in place of Cab-o-jet 270.

Example 44

Production of Ink 44 Containing Self-Dispersible Pigment

Ink 44 was produced in the same manner as in Example 3 except for using the aqueous dispersion 12 obtained in Preparation Example 12 in place of the aqueous dispersion 3 obtained in Preparation Example 3.

Example 45

Production of Ink 45 Containing Pigment-Containing Crosslinked Polymer Particles and Self-Dispersible Pigment Ink 45 was produced in the same manner as in Example 1 except for changing the amounts of 2-pyrrolidone to 3 parts, TEGmBE to 2.25 parts, ion exchange water to 25.45 parts, and the aqueous dispersion 1 obtained in Preparation Example 1 to 20.8 parts (solid content: 30%), and adding 25 parts (solid content: 20%) of the aqueous dispersion 12 obtained in Preparation Example 12.

Example 46

Production of Ink 46 Containing Pigment-Containing Crosslinked Polymer Particles and Self-Dispersible Pigment Ink 45 was produced in the same manner as in Example 1 except for changing the aqueous dispersion 1 obtained in Preparation Example 1 to the aqueous dispersion 2 obtained in Preparation Example 2 and changing the aqueous dispersion 12 obtained in Preparation Example 12 to the aqueous dispersion 3 obtained in Preparation Example 3.

Example 47

Production of Ink 47 Containing Pigment-Containing Crosslinked Polymer Particles Ink 47 was produced in the same manner as in Example 2 except for using a polyethylene glycol dimethyl ether (average molar number of added ethylene oxide: 10) in place of the polyethylene glycol monomethyl ether 550.

Comparative examples 18 to 20

Production of Comparative Inks 18 to 20

Comparative Inks 18 to 20 were produced in the same manner as in Example 1 except for using, as shown in Table 8, polyethylene glycol monoethyl mono-2-ethylhexyl ether (average molar number of added ethylene oxide: 7), polyethylene glycol mono-2-ethylhexyl ether (average molar number of added ethylene oxide: 7), polyethylene glycol monoethyl ether (average molar number of added ethylene oxide: 3) respectively in place of the polyethylene glycol monomethyl ether 350.

Comparative Example 21

Production of Comparative Ink 21

Comparative Ink 21 was produced in the same manner as in Example 2 except for using a polyethylene glycol monoethyl ether (average molar number of added ethylene oxide: 15) in place of the polyethylene glycol monomethyl ether 550.

Comparative Example 22

Production of Comparative Ink 22

Comparative Ink 22 was produced in the same manner as in Example 2 except for changing the amount of TEGmBE to 13 parts and using 9 parts of a polyethylene glycol monomethyl ether (average molar number of added ethylene oxide: 3) in place of 20 parts of the polyethylene glycol monomethyl ether 550.

Comparative Example 28

Production of Comparative Ink 23

Comparative Ink 23 was produced in the same manner as in Example 3 except for using polyethylene glycol=methyl ether (average molar number of added ethylene oxide: 15) in place of the polyethylene glycol monomethyl ether 550.

Comparative Examples 24-27

Production of Comparative Inks 24 to 27

Comparative Inks 24 to 27 were produced in the same manner as in Comparative Example 15 except for using, as shown in Table 8, polyethylene glycol monomethyl ether (average molar number of added ethylene oxide: 5), polyethylene glycol monomethyl ether (average molar number of added ethylene oxide: 6), polyethylene glycol monomethyl ether (average molar number of added ethylene oxide: 8), and polyethylene glycol monomethyl ether (average molar number of added ethylene oxide: 10) respectively in place of polyethylene glycol monomethyl ether 350.

The evaluation results of Examples 44 to 47 and Comparative Examples 18 to 27 are shown in Table 8.

TABLE 8

| | | Ink Composition | | | | | | | |
|---|---|---|---|---|---|---|---|---|---|
| | | aqueous dispersion (colorant) | | compound (1) | | other additives (wt. parts) | | water | compound (1)/water |
| | | kind of pigment | solid content wt. % | kind | wt. % | 2-PDN | TEGmBE | wt. % | wt. ratio |
| Ex. 44 | Ink 44 | self-dispersible type 12 | 10.0 | Me-EO7 | 20.0 | 2.0 | 4.5 | 60.0 | 0.33 |
| Ex. 45 | Ink 45 | crosslinked particle 1 + self-dispersible type 12 | 11.3 | Mo-EO7 | 20.0 | 3.0 | 2.2 | 59.8 | 0.33 |
| Ex. 46 | Ink 46 | crosslinked particle 2 + self-dispersible type 3 | 11.3 | Me-EO12 | 20.0 | 2.0 | 3.2 | 60.0 | 0.33 |
| Ex. 47 | Ink 47 | crosslinked particle 2 | 12.5 | Me-EO10-Me | 20.0 | 2.0 | 2.0 | 60.0 | 0.33 |
| Comp. 18 | comp. Ink 18 | crosslinked particle 1 | 12.5 | Et-EO7-EtHe | 20.0 | 2.0 | 2.0 | 60.0 | 0.33 |
| Comp. 19 | comp. Ink 19 | crosslinked particle 1 | 12.5 | EtHe-EO7 | 20.0 | 2.0 | 2.0 | 60.0 | 0.33 |
| Comp. 20 | comp. Ink 20 | crosslinked particle 1 | 12.5 | Et-EO3 | 20.0 | 2.0 | 2.0 | 45.0 | 0.44 |
| Comp. 21 | comp. Ink 21 | crosslinked particle 2 | 12.5 | Et-EO15 | 20.0 | 2.0 | 2.0 | 60.0 | 0.33 |
| Comp. 22 | comp. Ink 22 | crosslinked particle 2 | 12.5 | Me-EO3 | 9.0 | 2.0 | 13.0 | 60.0 | 0.15 |
| Comp. 23 | comp. Ink 23 | self-dispersible type 3 | 10.0 | Et-EO15 | 20.0 | 2.0 | 4.5 | 60.0 | 0.33 |
| Comp. 24 | comp. Ink 24 | Polymer dispersion type 1 | 12.5 | Me-EO5 | 20.0 | 2.0 | 2.0 | 60.0 | 0.33 |
| Comp. 25 | comp. Ink 25 | Polymer dispersion type 1 | 12.5 | Me-EO6 | 20.0 | 2.0 | 2.0 | 60.0 | 0.33 |
| Comp. 26 | Ink 26 | Polymer dispersion type 1 | 12.5 | Me-EO8 | 20.0 | 2.0 | 2.0 | 60.0 | 0.33 |
| Comp. 27 | comp. Ink 27 | Polymer dispersion type 1 | 12.5 | Me-EO10 | 20.0 | 2.0 | 2.0 | 60.0 | 0.33 |

| | Evaluation Results | | | | | | |
|---|---|---|---|---|---|---|---|
| | water content* (mg/cm$^2$) | deaeration ability (min) | jetting performance | jetting stability (J) | curl prevention effect 1 (cm) | print density | storage stability (%) | curl prevention effect 2 (cm) |
| Ex. 44 | 0.48 | 4 | 0 | — | 0.9 | 0.96 | 109 | — |
| Ex. 45 | 0.48 | 7 | 0 | — | 0.7 | 0.98 | 109 | — |
| Ex. 46 | 0.48 | 10 | 0 | — | 0.4 | 1.05 | 104 | — |
| Ex. 47 | 0.48 | 10 | 0 | — | 0.3 | 1.07 | 106 | — |
| Comp. 18 | 0.48 | 2 | 0 | — | 4.3 | 0.89 | 135 | — |
| Comp. 19 | 0.48 | 3 | 0 | — | 4.2 | 0.89 | 156 | — |
| Comp. 20 | 0.36 | 6 | 0 | — | 2.8 | 0.89 | 121 | — |
| Comp. 21 | 0.48 | 15 | 2 | — | 2.1 | 1.02 | 103 | — |
| Comp. 22 | 0.48 | 15 | 0 | — | 2.7 | 0.97 | 103 | — |
| Comp. 23 | 0.48 | 10 | 5 | — | 2.2 | 1.03 | 109 | — |
| Comp. 24 | 0.48 | 8 | 1 | — | 3.5 | 0.88 | 106 | — |
| Comp. 25 | 0.48 | 12 | 1 | — | 1.2 | 0.93 | 106 | 3.2 |
| Comp. 26 | 0.48 | 20 | 1 | — | 0.9 | 0.94 | 106 | 2.9 |
| Comp. 27 | 0.48 | 45 | 7 | — | 0.9 | 0.94 | 115 | — |

*water content in printed image.

The results of the above tables are collectively shown in Tables 9 and 10 for convenience.

TABLE 9

| | | Ink Composition | | | | | | | |
|---|---|---|---|---|---|---|---|---|---|
| | | aqueous dispersion (colorant) | | compound (1) | | other additives (wt. parts) | | water | compound (1)/water |
| | | kind of pigment | solid content wt. % | kind | wt. % | 2-PDN | TEGmBE | wt. % | wt. ratio |
| Ex. 1 | Ink 1 | crosslinked particle 1 | 12.5 | Me-EO7 | 20.0 | 2.0 | 2.0 | 60.0 | 0.33 |
| Ex. 2 | Ink 2 | crosslinked particle 2 | 12.5 | Me-EO12 | 20.0 | 2.0 | 2.0 | 60.0 | 0.33 |
| Ex. 3 | Ink 3 | self-dispersible type 3 | 10.0 | Me-EO12 | 20.0 | 2.0 | 4.5 | 60.0 | 0.33 |
| Ex. 4 | Ink 4 | crosslinked particle 1 | 12.5 | Me-EO7 | 10.0 | 2.0 | 12.0 | 60.0 | 0.17 |
| Ex. 5 | Ink 5 | crosslinked particle 1 | 12.5 | Me-EO7 | 16.0 | 2.0 | 6.0 | 60.0 | 0.27 |
| Ex. 6 | Ink 6 | crosslinked particle 1 | 12.5 | Me-EO7 | 24.0 | 0.0 | 0.0 | 60.0 | 0.40 |
| Ex. 7 | Ink 7 | crosslinked particle 1 | 12.5 | Me-EO7 | 27.5 | 0.0 | 1.5 | 55.0 | 0.50 |
| Ex. 8 | Ink 8 | crosslinked particle 2 | 12.5 | Me-EO12 | 10.0 | 2.0 | 12.0 | 60.0 | 0.17 |
| Ex. 9 | Ink 9 | crosslinked particle 2 | 12.5 | Me-EO12 | 16.0 | 2.0 | 6.0 | 60.0 | 0.27 |
| Ex. 10 | Ink 10 | crosslinked particle 2 | 12.5 | Me-EO12 | 24.0 | 0.0 | 0.0 | 60.0 | 0.40 |
| Ex. 11 | Ink 11 | crosslinked particle 2 | 12.5 | Me-EO12 | 27.5 | 0.0 | 1.5 | 55.0 | 0.50 |
| Ex. 12 | Ink 12 | self-dispersible type 3 | 10.0 | Me-EO12 | 10.0 | 2.0 | 14.5 | 60.0 | 0.17 |
| Ex. 13 | Ink 13 | self-dispersible type 3 | 10.0 | Me-EO12 | 16.0 | 2.0 | 8.5 | 60.0 | 0.27 |
| Ex. 14 | Ink 14 | self-dispersible type 3 | 10.0 | Me-EO12 | 24.0 | 0.0 | 2.5 | 60.0 | 0.40 |
| Ex. 15 | Ink 15 | self-dispersible type 3 | 10.0 | Me-EO12 | 27.5 | 0.0 | 4.0 | 55.0 | 0.50 |
| Ex. 16 | Ink 16 | crosslinked particle 1 | 12.5 | Me-EO7 | 20.0 | 2.0 | 12.0 | 50.0 | 0.40 |
| Ex. 17 | Ink 17 | crosslinked particle 1 | 12.5 | Me-EO7 | 20.0 | 2.0 | 7.0 | 55.0 | 0.36 |
| Ex. 18 | Ink 18 | crosslinked particle 1 | 12.5 | Me-EO7 | 16.0 | 2.0 | 1.0 | 65.0 | 0.25 |
| Ex. 19 | Ink 19 | crosslinked particle 2 | 12.5 | Me-EO12 | 20.0 | 2.0 | 12.0 | 50.0 | 0.40 |
| Ex. 20 | Ink 20 | crosslinked particle 2 | 12.5 | Me-EO12 | 20.0 | 2.0 | 7.0 | 55.0 | 0.36 |
| Ex. 21 | Ink 21 | crosslinked particle 2 | 12.5 | Me-EO12 | 16.0 | 2.0 | 1.0 | 65.0 | 0.25 |
| Ex. 22 | Ink 22 | self-dispersible type 3 | 10.0 | Me-EO12 | 20.0 | 2.0 | 14.5 | 50.0 | 0.40 |
| Ex. 23 | Ink 23 | self-dispersible type 3 | 10.0 | Me-EO12 | 20.0 | 2.0 | 9.5 | 55.0 | 0.36 |
| Ex. 24 | Ink 24 | self-dispersible type 3 | 10.0 | Me-EO12 | 16.0 | 0.0 | 5.5 | 65.0 | 0.25 |
| Ex. 25 | Ink 25 | polymer particle 4 | 12.5 | Me-EO7 | 20.0 | 2.0 | 2.0 | 60.0 | 0.33 |
| Ex. 26 | Ink 26 | polymer particle 5 | 12.5 | Me-EO12 | 20.0 | 2.0 | 2.0 | 60.0 | 0.33 |
| Ex. 27 | Ink 27 | crosslinked particle 6 | 12.5 | Me-EO7 | 20.0 | 2.0 | 2.0 | 60.0 | 0.33 |
| Ex. 28 | Ink 28 | crosslinked particle 7 | 12.5 | Me-EO12 | 20.0 | 2.0 | 2.0 | 60.0 | 0.33 |
| Ex. 29 | Ink 29 | crosslinked particle 8 | 12.5 | Me-EO7 | 20.0 | 2.0 | 2.0 | 60.0 | 0.33 |

TABLE 9-continued

| | | | | | | | | | |
|---|---|---|---|---|---|---|---|---|---|
| Ex. 30 | Ink 30 | crosslinked particle 9 | 12.5 | Me-EO12 | 20.0 | 2.0 | 2.0 | 60.0 | 0.33 |
| Ex. 31 | Ink 31 | crosslinked particle 10 | 12.5 | Me-EO7 | 20.0 | 2.0 | 2.0 | 60.0 | 0.33 |
| Ex. 32 | Ink 32 | crosslinked particle 11 | 12.5 | Me-EO12 | 20.0 | 2.0 | 2.0 | 60.0 | 0.33 |
| Ex. 33 | Ink 33 | crosslinked particle 1 | 12.5 | Me-EO7 | 20.0 | 2.0 | 2.2 | 60.0 | 0.33 |
| Ex. 34 | Ink 34 | crosslinked particle 2 | 12.5 | Me-EO12 | 20.0 | 2.0 | 2.2 | 60.0 | 0.33 |
| Ex. 35 | Ink 35 | self-dispersible type 3 | 10.0 | Me-EO12 | 20.0 | 2.0 | 4.7 | 60.0 | 0.33 |
| Ex. 36 | Ink 36 | self-dispersible type 3 | 10.0 | Me-EO15 | 20.0 | 2.0 | 4.5 | 60.0 | 0.33 |
| Ex. 37 | Ink 37 | self-dispersible type 3 | 10.0 | Me-EO20 | 20.0 | 2.0 | 4.5 | 60.0 | 0.33 |
| Ex. 38 | Ink 38 | crosslinked particle 1 | 12.5 | Me-EO7 | 20.0 | 2.0 | 2.0 | 60.0 | 0.33 |
| Ex. 39 | Ink 39 | crosslinked particle 1 | 12.5 | Me-EO7 | 20.0 | 2.0 | 2.0 | 60.0 | 0.33 |
| Ex. 40 | Ink 40 | crosslinked particle 1 | 12.5 | Me-EO7 | 20.0 | 2.0 | 2.0 | 60.0 | 0.33 |
| Ex. 41 | Ink 41 | crosslinked particle 2 | 12.5 | Me-EO12 | 20.0 | 2.0 | 2.0 | 60.0 | 0.33 |
| Ex. 42 | Ink 42 | crosslinked particle 2 | 12.5 | Me-EO12 | 20.0 | 2.0 | 2.0 | 60.0 | 0.33 |
| Ex. 43 | Ink 43 | crosslinked particle 2 | 12.5 | Me-EO12 | 20.0 | 2.0 | 2.0 | 60.0 | 0.33 |
| Ex. 44 | Ink 44 | self-dispersible type 12 | 10.0 | Me-EO7 | 20.0 | 2.0 | 4.5 | 60.0 | 0.33 |
| Ex. 45 | Ink 45 | crosslinked particle 1 + self-dispersible type 12 | 11.3 | Me-EO7 | 20.0 | 3.0 | 2.2 | 59.8 | 0.33 |
| Ex. 46 | Ink 46 | crosslinked particle 2 + self-dispersible type 3 | 11.3 | Me-EO12 | 20.0 | 2.0 | 3.2 | 60.0 | 0.33 |
| Ex. 47 | Ink 47 | crosslinked particle 2 | 12.5 | Me-EO10-Me | 20.0 | 2.0 | 2.0 | 60.0 | 0.33 |

| | | | Evaluation Results | | | | | |
|---|---|---|---|---|---|---|---|---|
| | water content* (mg/cm²) | deaeration ability (min) | jetting performance | jetting stability (J) | curl prevention effect 1 (cm) | print density | storage stability (%) | curl prevention effect 2 (cm) |
| Ex. 1 | 0.48 | 9 | 0 | 113% | 0.5 | 0.95 | 103 | 0.7 |
| Ex. 2 | 0.48 | 15 | 0 | 112% | 0.3 | 1.04 | 103 | 0.3 |
| Ex. 3 | 0.48 | 10 | 0 | — | 0.4 | 1.05 | 104 | 0.5 |
| Ex. 4 | 0.48 | 5 | 0 | 102% | 1.8 | 0.91 | 113 | — |
| Ex. 5 | 0.48 | 7 | 0 | 106% | 0.9 | 0.93 | 102 | — |
| Ex. 6 | 0.48 | 14 | 0 | 117% | 0.3 | 0.96 | 103 | — |
| Ex. 7 | 0.44 | 20 | 0 | 110% | 0.2 | 0.93 | 104 | — |
| Ex. 8 | 0.48 | 9 | 0 | 103% | 1.5 | 1.00 | 109 | — |
| Ex. 9 | 0.48 | 11 | 0 | 105% | 0.8 | 1.02 | 106 | — |
| Ex. 10 | 0.48 | 17 | 0 | 116% | 0.8 | 1.04 | 104 | — |
| Ex. 11 | 0.44 | 20 | 0 | 110% | 0.3 | 1.01 | 102 | — |
| Ex. 12 | 0.48 | 4 | 0 | — | 1.6 | 1.01 | 109 | — |
| Ex. 13 | 0.48 | 5 | 0 | — | 0.9 | 1.03 | 107 | — |
| Ex. 14 | 0.48 | 12 | 0 | — | 0.9 | 1.05 | 105 | — |
| Ex. 15 | 0.44 | 16 | 0 | — | 0.5 | 1.02 | 103 | — |
| Ex. 16 | 0.40 | 7 | 0 | — | 0.2 | 0.93 | 109 | — |
| Ex. 17 | 0.44 | 10 | 0 | — | 0.4 | 0.95 | 107 | — |
| Ex. 18 | 0.52 | 13 | 0 | — | 1.7 | 0.93 | 101 | — |
| Ex. 19 | 0.40 | 10 | 0 | — | 0.2 | 1.00 | 109 | — |
| Ex. 20 | 0.44 | 13 | 0 | — | 0.4 | 1.02 | 107 | — |
| Ex. 21 | 0.52 | 17 | 0 | — | 1.7 | 1.04 | 101 | — |
| Ex. 22 | 0.40 | 5 | 0 | — | 0.3 | 1.01 | 109 | — |
| Ex. 23 | 0.44 | 8 | 0 | — | 0.5 | 1.03 | 108 | — |
| Ex. 24 | 0.52 | 12 | 0 | — | 1.8 | 1.05 | 102 | — |
| Ex. 25 | 0.48 | 12 | 1 | — | 1.5 | 0.95 | 117 | — |
| Ex. 26 | 0.48 | 25 | 1 | — | 1.1 | 1.04 | 114 | — |

TABLE 9-continued

| | | | | | | | | |
|---|---|---|---|---|---|---|---|---|
| Ex. 27 | 0.48 | 7 | 1 | — | 0.4 | 0.95 | 115 | — |
| Ex. 28 | 0.48 | 15 | 1 | — | 0.2 | 1.04 | 116 | — |
| Ex. 29 | 0.48 | 12 | 1 | — | 0.9 | 0.93 | 116 | — |
| Ex. 30 | 0.48 | 20 | 1 | — | 0.9 | 1.02 | 118 | — |
| Ex. 31 | 0.48 | 7 | 0 | — | 0.5 | 0.92 | 102 | — |
| Ex. 32 | 0.48 | 15 | 0 | — | 0.3 | 1.01 | 102 | — |
| Ex. 33 | 0.48 | 9 | 0 | — | 0.5 | 0.95 | 108 | 1.5 |
| Ex. 34 | 0.48 | 15 | 0 | — | 0.3 | 1.04 | 101 | 1.3 |
| Ex. 35 | 0.48 | 10 | 0 | — | 0.5 | 1.05 | 102 | 1.5 |
| Ex. 36 | 0.48 | 15 | 0 | — | 0.4 | 1.06 | 104 | — |
| Ex. 37 | 0.48 | 19 | 0 | — | 0.4 | 1.07 | 104 | — |
| Ex. 38 | 0.24 | — | — | — | 0.1 | — | — | — |
| Ex. 39 | 0.72 | — | — | — | 0.5 | — | — | — |
| Ex. 40 | 0.96 | — | — | — | 0.9 | — | — | — |
| Ex. 41 | 0.24 | — | — | — | 0.1 | — | — | — |
| Ex. 42 | 0.72 | — | — | — | 0.5 | — | — | — |
| Ex. 43 | 0.96 | — | — | — | 0.9 | — | — | — |
| Ex. 44 | 0.48 | 4 | 0 | — | 0.9 | 0.96 | 109 | — |
| Ex. 45 | 0.48 | 7 | 0 | — | 0.7 | 0.98 | 109 | — |
| Ex. 46 | 0.48 | 10 | 0 | — | 0.4 | 1.05 | 104 | — |
| Ex. 47 | 0.48 | 10 | 0 | — | 0.3 | 1.07 | 106 | — |

*water content in printed image.

TABLE 10

| | | Ink Composition | | | | | | |
|---|---|---|---|---|---|---|---|---|
| | | aqueous dispersion (colorant) | | compound (1) | | other additives (wt. parts) | | water | compound (1)/water |
| | | kind of pigment | solid content wt. % | kind | wt. % | 2-PDN | TEGmBE | wt. % | wt. ratio |
| Comp. 1 | comp. Ink 1 | crosslinked particle 1 | 12.5 | none | 0.0 | 2.0 | 22.0 | 60.0 | 0.00 |
| Comp. 2 | comp. Ink 2 | crosslinked particle 1 | 12.5 | Me-EO7 | 5.0 | 2.0 | 17.0 | 60.0 | 0.08 |
| Comp. 3 | comp. Ink 3 | crosslinked particle 2 | 12.5 | none | 0.0 | 2.0 | 22.0 | 60.0 | 0.00 |
| Comp. 4 | comp. Ink 4 | crosslinked particle 2 | 12.5 | Me-EO12 | 9.0 | 2.0 | 13.0 | 60.0 | 0.15 |
| Comp. 5 | comp. Ink 5 | self-dispersible type 3 | 10.0 | none | 0.0 | 2.0 | 24.5 | 60.0 | 0.00 |
| Comp. 6 | comp. Ink 6 | self-dispersible type 3 | 10.0 | Me-EO12 | 9.0 | 2.0 | 15.5 | 60.0 | 0.15 |
| Comp. 7 | comp. Ink 7 | crosslinked particle 1 | 12.5 | Me-EO7 | 20.0 | 2.0 | 17.0 | 45.0 | 0.44 |
| Comp. 8 | comp. Ink 8 | crosslinked particle 1 | 12.5 | Me-EO7 | 16.0 | 0.0 | 0.5 | 67.5 | 0.24 |
| Comp. 9 | comp. Ink 9 | crosslinked particle 2 | 12.5 | Me-EO12 | 20.0 | 2.0 | 17.0 | 45.0 | 0.44 |
| Comp. 10 | comp. Ink 10 | crosslinked particle 2 | 12.5 | Me-EO12 | 16.0 | 0.0 | 0.5 | 67.5 | 0.24 |
| Comp. 11 | comp. Ink 11 | self-dispersible type 3 | 10.0 | Me-EO12 | 20.0 | 2.0 | 19.5 | 45.0 | 0.44 |
| Comp. 12 | comp. Ink 12 | self-dispersible type 3 | 10.0 | Me-EO12 | 16.0 | 0.0 | 3.0 | 67.5 | 0.24 |
| Comp. 13 | comp. Ink 13 | dye Acid Blue | 10.0 | Me-EO7 | 20.0 | 2.0 | 4.5 | 60.0 | 0.33 |
| Comp. 14 | comp. Ink 14 | yellow food dye | 3.0 | Me-EO7 | 27.0 | 2.0 | 4.5 | 60.0 | 0.45 |
| Comp. 15 | comp. Ink 15 | polymer dispersion type 1 | 12.5 | Me-EO7 | 20.0 | 2.0 | 2.0 | 60.0 | 0.33 |
| Comp. 16 | comp. Ink 16 | polymer dispersion type 2 | 12.5 | Me-EO12 | 20.0 | 2.0 | 2.0 | 60.0 | 0.33 |
| Comp. 17 | comp. Ink 17 | self-dispersible type 3 | 10.0 | Me-EO21 | 20.0 | 2.0 | 4.5 | 60.0 | 0.33 |

TABLE 10-continued

| | | | | | | | | | |
|---|---|---|---|---|---|---|---|---|---|
| Comp. 18 | comp. Ink 18 | crosslinked particle 1 | 12.5 | Et-EO7-EtHe | 20.0 | 2.0 | 2.0 | 60.0 | 0.33 |
| Comp. 19 | comp. Ink 19 | crosslinked particle 1 | 12.5 | EtHe-EO7 | 20.0 | 2.0 | 2.0 | 60.0 | 0.33 |
| Comp. 20 | comp. Ink 20 | crosslinked particle 1 | 12.5 | Et-EO3 | 20.0 | 2.0 | 2.0 | 45.0 | 0.44 |
| Comp. 21 | comp. Ink 21 | crosslinked particle 2 | 12.5 | Et-EO15 | 20.0 | 2.0 | 2.0 | 60.0 | 0.33 |
| Comp. 22 | comp. Ink 22 | crosslinked particle 2 | 12.5 | Me-EO3 | 9.0 | 2.0 | 13.0 | 60.0 | 0.15 |
| Comp. 23 | comp. Ink 23 | self-dispersible type 3 | 10.0 | Et-EO15 | 20.0 | 2.0 | 4.5 | 60.0 | 0.33 |
| Comp. 24 | comp. Ink 24 | polymer dispersion type 1 | 12.5 | Me-EO5 | 20.0 | 2.0 | 2.0 | 60.0 | 0.33 |
| Comp. 25 | comp. Ink 25 | polymer dispersion type 1 | 12.5 | Me-EO6 | 20.0 | 2.0 | 2.0 | 60.0 | 0.33 |
| Comp. 26 | comp. Ink 26 | polymer dispersion type 1 | 12.5 | Me-EO8 | 20.0 | 2.0 | 2.0 | 60.0 | 0.33 |
| Comp. 27 | comp. Ink 27 | polymer dispersion type 1 | 12.5 | Me-EO10 | 20.0 | 2.0 | 2.0 | 60.0 | 0.33 |

| | | Evaluation Results | | | | | | |
|---|---|---|---|---|---|---|---|---|
| | water content* (mg/cm$^2$) | deaeration ability (min) | jetting performance | jetting stability (J) | curl prevention effect 1 (cm) | print density | storage stability (%) | curl prevention effect 2 (cm) |
| Comp. 1 | 0.48 | 3 | 0 | 100% | 5.2 | 0.86 | 143 | — |
| Comp. 2 | 0.48 | 3 | 0 | 100% | 1.9 | 0.91 | 115 | — |
| Comp. 3 | 0.48 | 9 | 0 | 100% | 4.8 | 0.91 | 195 | — |
| Comp. 4 | 0.48 | 9 | 0 | — | 1.9 | 0.95 | 116 | — |
| Comp. 5 | 0.48 | 5 | 2 | — | 5.2 | 0.91 | gelated | — |
| Comp. 6 | 0.48 | 4 | 3 | — | 1.9 | 0.95 | 109 | — |
| Comp. 7 | 0.36 | 5 | 3 | — | 0.1 | 0.89 | 132 | — |
| Comp. 8 | 0.54 | 15 | 0 | — | 2.9 | 0.92 | 101 | — |
| Comp. 9 | 0.36 | 7 | 5 | — | 0.1 | 0.97 | 132 | — |
| Comp. 10 | 0.54 | 20 | 0 | — | 2.9 | 1.04 | 101 | — |
| Comp. 11 | 0.36 | 2 | 6 | — | 0.2 | 0.97 | gelated | — |
| Comp. 12 | 0.54 | 16 | 0 | — | 3.3 | 1.05 | 102 | — |
| Comp. 13 | 0.48 | 2 | 0 | — | 0.3 | 0.97 | aggregated | — |
| Comp. 14 | 0.48 | 2 | 6 | — | 0.3 | 0.68 | aggregated | — |
| Comp. 15 | 0.48 | 15 | 1 | — | 1.0 | 0.94 | 106 | 3.0 |
| Comp. 16 | 0.48 | not deaerated | 7 | — | 1.0 | 0.99 | 106 | — |
| Comp. 17 | 0.48 | 45 | 6 | — | 0.6 | 1.05 | 105 | — |
| Comp. 18 | 0.48 | 2 | 0 | — | 4.3 | 0.89 | 135 | — |
| Comp. 19 | 0.48 | 3 | 0 | — | 4.2 | 0.89 | 156 | — |
| Comp. 20 | 0.36 | 6 | 0 | — | 2.8 | 0.89 | 121 | — |
| Comp. 21 | 0.48 | 15 | 2 | — | 2.1 | 1.02 | 103 | — |
| Comp. 22 | 0.48 | 15 | 0 | — | 2.7 | 0.97 | 103 | — |
| Comp. 23 | 0.48 | 10 | 5 | — | 2.2 | 1.03 | 109 | — |
| Comp. 24 | 0.48 | 8 | 1 | — | 3.5 | 0.88 | 106 | — |
| Comp. 25 | 0.48 | 12 | 1 | — | 1.2 | 0.93 | 106 | 3.2 |
| Comp. 26 | 0.48 | 20 | 1 | — | 0.9 | 0.94 | 106 | 2.9 |
| Comp. 27 | 0.48 | 45 | 7 | — | 0.9 | 0.94 | 115 | — |

*water content in printed image.

The details of pigment, compounds, etc. in Tables 1 to 9 are described below.

Kinds of Pigment, etc.

Crosslinked particle 1: pigment-containing crosslinked polymer particle obtained in Preparation Example 1.

Crosslinked particle 2: pigment-containing crosslinked polymer particle obtained in Preparation Example 2.

Crosslinked particles 6 to 11: pigment-containing crosslinked polymer particles obtained in Preparation Examples 6 to 11.

Self-dispersible type 3: self-dispersible pigment obtained in Preparation Example 3.

Self-dispersible type 12: self-dispersible pigment obtained in Preparation Example 12.

Polymer dispersion type 1: polymer dispersion type pigment obtained in Comparative Preparation Example 1.

Polymer dispersion type 2: polymer dispersion type pigment obtained in Comparative Preparation Example 2.

Polymer particle 4: pigment-containing non-crosslinked polymer particles obtained in Preparation Example 4.

Polymer particle 5: pigment-containing non-crosslinked polymer particles obtained in Preparation Example 5.

Compounds of Formula (1), etc.

Me-EO 3 to 21: polyethylene glycol monomethyl ether (the number "3 to 21" is the average molar number of addition of ethylene oxide chain, the same shall apply below).

Et-EO 3 to 15: polyethylene glycol monoethyl ether (average molar number of addition of ethylene oxide chain: 3 to 15).

EtHe-EO 7: polyethylene glycol mono-2-ethylhexyl ether (average molar number of addition of ethylene oxide chain: 7).

Et-EO 7-EtHe: polyethylene glycol monoethyl mono-2-ethylhexyl ether (e average molar number of addition of ethylene oxide chain: 7).

Me-EU 10-Me: polyethylene glycol dimethyl ether (average molar number of addition of ethylene oxide chain: 10).

2-PDN: 2-pyrrolidone.

TEGmBE: triethylene glycol monobutyl ether.

As seen form Tables 1 to 8, it can be seen that the aqueous ink of the invention is excellent in the curl prevention after print, the curl prevention after storage, and print density; further excellent in the storage stability and jetting stability, and still further excellent in the jetting performance and deaeration

INDUSTRIAL APPLICABILITY

According to the present invention, an aqueous ink for inkjet printing which is excellent in the curl prevention after print and its storage and print density as well as in the storage stability and jetting stability, and a method of inkjet printing are provided.

What is claimed is:

1. An aqueous ink for inkjet printing which comprises a pigment-containing polymer particle and/or a self-dispersible pigment, a compound represented by formula (1), and water in a content of 50 to 65% by weight, wherein a content of the compound represented by formula (1) is 10 to 30% by weight and formula (1) is represented by:

$$CH_3-O-(CH_2CH_2O)n\text{-}R^1 \qquad (1)$$

wherein $R^1$ is hydrogen atom, an aliphatic group having 1 to 6 carbon atoms, or an alicyclic group having 3 to 6 carbon atoms, and n is an average molar number of addition of 6 to 20.

2. The aqueous ink for inkjet printing according to claim 1, wherein a content of the pigment is 5 to 12% by weight.

3. The aqueous ink for inkjet printing according to claim 1, wherein a weight ratio of a content of the compound represented by formula (I) to a content of water represented by (content of the compound represented by formula (I))/(content of water) is 0.16 to 0.60.

4. The aqueous ink for inkjet printing according to claim 1, wherein the pigment-containing polymer particle is a crosslinked polymer particle obtained by crosslinking a polymer in the pigment-containing polymer particle with a crosslinking agent.

5. The aqueous ink for inkjet printing according to claim 4, wherein the polymer has carboxyl group and an amount of the carboxyl group neutralized by a base is 0.5 to 5 mmol per 1 g of the crosslinked polymer.

6. The aqueous ink for inkjet printing according to claim 4, wherein the polymer is a graft polymer comprising (a) a constitutional unit derived from a monomer having a salt-forming group, and (b) a constitutional unit derived from a macromer and/or (c) a constitutional unit derived from a hydrophobic monomer.

7. The aqueous ink for inkjet printing according to claim 4, wherein the polymer comprises a constitutional unit derived from a monomer represented by formula (3):

$$CH_2=C(R^2)COO(R^3O)_qR^4 \qquad (3)$$

wherein $R^2$ is hydrogen atom or an alkyl group having 1 to 5 carbon atoms, $R^3$ is a divalent hydrocarbon group having 1 to 30 carbon atoms which may have a heteroatom, $R^4$ is a monovalent hydrocarbon group having 1 to 30 carbon atoms which may have a heteroatom, or phenyl group which may have an alkyl group having 1 to 9 carbon atoms, and q is an average molar number of addition of 1 to 60.

8. The aqueous ink for inkjet printing according to claim 1, further comprises an antioxidant.

9. An method of inkjet-printing images on plain paper by one-pass print using the aqueous ink as defined in claim 1, wherein a water content in the aqueous ink which is jetted onto unit area of the plain paper is 0.2 to 1.0 mg/cm².

* * * * *